(12) United States Patent
Wang et al.

(10) Patent No.: US 12,071,833 B2
(45) Date of Patent: Aug. 27, 2024

(54) OPTIMIZING SCALE MANAGEMENT AT THE SUBSURFACE FOR IMPROVED WELL PERFORMANCE

(71) Applicant: Chevron U.S.A. Inc., San Ramon, CA (US)

(72) Inventors: Wei Wang, Houston, TX (US); Wei Wei, Sugar Land, TX (US); Chao Yan, Sugar Land, TX (US); Gregory A. Winslow, Houston, TX (US); Lauren N. DeVoe, Midland, TX (US); Baosheng Liang, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 18/100,775

(22) Filed: Jan. 24, 2023

(65) Prior Publication Data

US 2023/0235646 A1   Jul. 27, 2023

Related U.S. Application Data

(60) Provisional application No. 63/302,397, filed on Jan. 24, 2022.

(51) Int. Cl.
*E21B 37/06* (2006.01)
*E21B 43/26* (2006.01)
(Continued)

(52) U.S. Cl.
CPC ............ *E21B 37/06* (2013.01); *E21B 43/26* (2013.01); *E21B 49/02* (2013.01)

(58) Field of Classification Search
CPC .......... E21B 37/06; E21B 43/16; E21B 43/26; E21B 47/00; E21B 49/08; E21B 47/006
See application file for complete search history.

(56) References Cited

U.S. PATENT DOCUMENTS

2019/0292881 A1* 9/2019 Zhang .................... E21B 47/10
2023/0399938 A1* 12/2023 Hernandez de la Bastida ............ E21B 47/00

FOREIGN PATENT DOCUMENTS

CA    2963521 C  * 12/2020  ................ C02F 5/12

OTHER PUBLICATIONS

Wei Wang et al. (16 Authors Total), Tackling a Critical Challenge in Shale Development in the Delaware Basin: An Interdisciplinary Field Case Study on Subsurface Scale Diagnosis and Control and Impact on Production Performance, Unconventional Resources Technology Conference, Houston, Texas, Jun. 20-22, 2022, 17 pages.

* cited by examiner

*Primary Examiner* — Zakiya W Bates
(74) *Attorney, Agent, or Firm* — Smith & Woldesenbet Law Group, PLLC

(57) ABSTRACT

A method for evaluating and optimizing scale management at a subsurface for improved well performance may include performing multiple first tests, where each first test combines a first fluid with a second fluid, wherein the first fluid comprises a concentration of a scale inhibitor and a chemistry of additional fluid components. The method may also include identifying an optimal mixture of the first fluid among the first tests, where the optimal mixture comprises a minimum concentration of the scale inhibitor that reduces scale deposition. The method may further include performing a second test that combines the first fluid with the scale inhibitor, the second fluid, and rock. The method may also include evaluating a concentration of the scale inhibitor in aqueous phase after a period of time after initiating the second test. The method may further include identifying a target fluid for use in a field operation at the subsurface.

16 Claims, 10 Drawing Sheets

(51) Int. Cl.
*E21B 49/08* (2006.01)
*E21B 49/02* (2006.01)

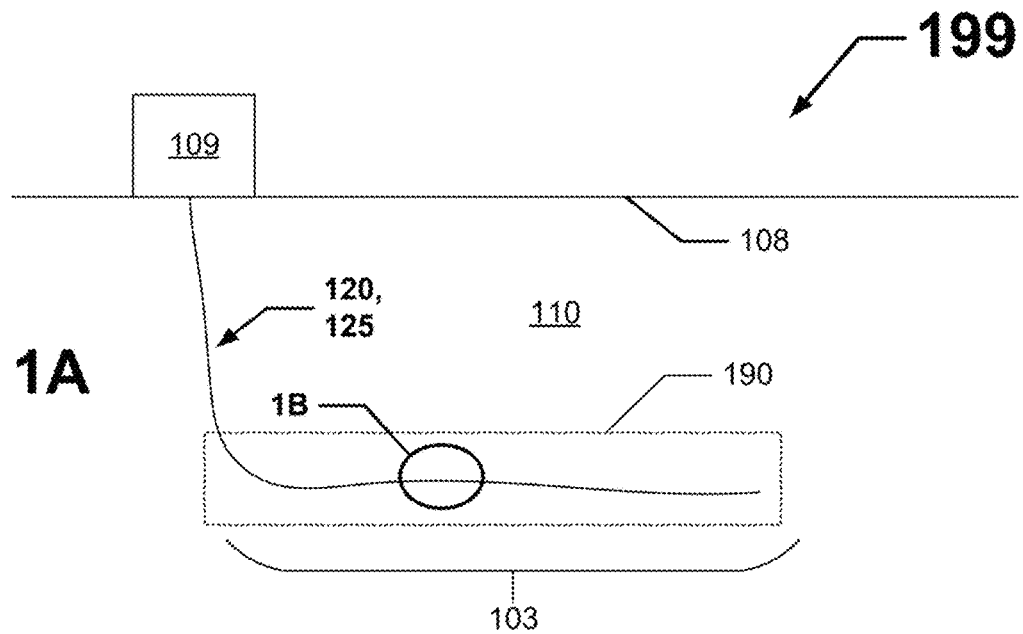
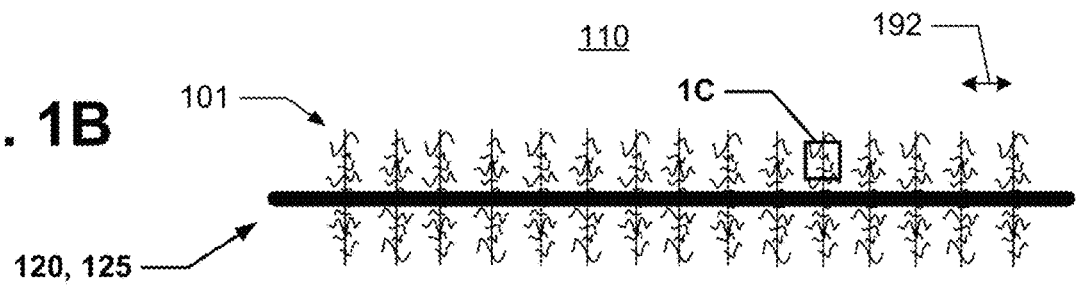
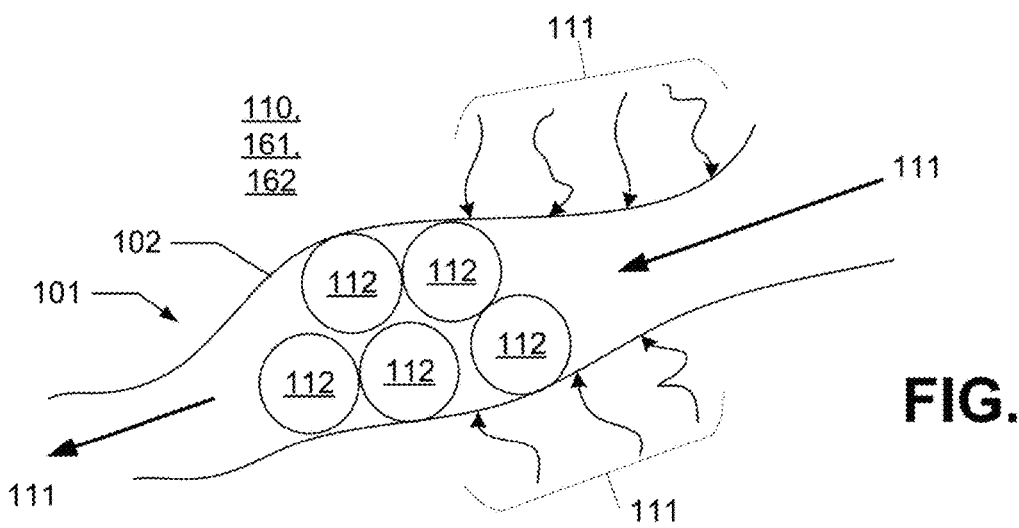

OPTIMIZING SCALE MANAGEMENT AT THE SUBSURFACE FOR IMPROVED WELL PERFORMANCE

CROSS-REFERENCE TO RELATED APPLICATIONS

This application claims priority to U.S. Provisional Patent Application Ser. No. 63/302,397 titled "Optimizing Scale Management At The Subsurface For Improved Well Performance" and filed on Jan. 24, 2022, the entire contents of which are hereby incorporated herein by reference.

TECHNICAL FIELD

The present application is related to subterranean field operations and, more particularly, to optimizing scale management at the subsurface for improved well performance.

BACKGROUND

Some subterranean formations, such as shale, may produce subterranean resources through techniques such as horizontal drilling and hydraulic fracturing. Over time, the fractures may become restricted or blocked because of the accumulation of scale deposits and/or other solids in the fractures and/or on the fracture faces. Preventing, reducing, or mitigating the development and growth of these scale/solid deposits may lead to enhanced extraction of the subterranean resources for an extended period of time.

SUMMARY

In general, in one aspect, the disclosure relates to a method for evaluating and optimizing scale management at a subsurface for improved well performance. The method may include performing a plurality of first tests, where each of the plurality of first tests combines a first fluid with a second fluid, where the first fluid includes a concentration of a scale inhibitor and a chemistry of additional fluid components. The method may also include identifying an optimal mixture of the first fluid among the plurality of first tests, where the optimal mixture comprises a minimum concentration of the scale inhibitor that reduces scale deposition. The method may further include performing a second test that combines the first fluid with the scale inhibitor, the second fluid, and rock. The method may also include evaluating a concentration of the scale inhibitor in aqueous phase after a period of time after initiating the second test. The method may further include identifying, based on comparing the minimum concentration from among the plurality of first tests with the concentration of the scale inhibitor after the second test, a target fluid for use in a field operation at the subsurface, where the target fluid includes a target concentration of the scale inhibitor and a target chemistry of additional fluid components.

In another aspect, the disclosure relates to a system for optimizing scale management at a subsurface. The system may include a reaction module configured to receive, for a plurality of first tests, a plurality of first fluids and a second fluid, where each of the plurality of first fluids comprises the scale inhibitor having a concentration and a chemistry of additional fluid components, where each first test of the plurality of first tests combines one of the plurality of first fluids and the second fluid, and where an optimal mixture of one of the plurality of first fluids comprising a minimum concentration of the scale inhibitor that reduces scale deposition is identified. The reaction module may also be configured to receive, for a second test, the first fluid with the scale inhibitor, the second fluid, and rock, where a concentration of the scale inhibitor in aqueous phase is evaluated after a period of time, where a target fluid for use in a field operation at the subsurface is identified based on comparing the minimum concentration from the one of the plurality of first tests with the concentration of the scale inhibitor after the second test, and where the target fluid includes a target concentration of the scale inhibitor and a target chemistry of additional fluid components.

In yet another aspect, the disclosure relates to a non-transitory computer readable medium comprising computer readable program code, which when executed by a computer processor, enables the computer processor to facilitate performing a plurality of first tests, where each of the plurality of first tests combines a first fluid with a second fluid, and where the first fluid comprises a concentration of a scale inhibitor and a chemistry of additional fluid components; facilitate identifying an optimal mixture of the first fluid among the plurality of first tests, where the optimal mixture comprises a minimum concentration of the scale inhibitor that reduces scale deposition; facilitate performing a second test that combines the first fluid with the scale inhibitor, the second fluid, and rock; facilitate evaluating a concentration of the scale inhibitor in aqueous phase after a period of time after initiating the second test; and facilitate identifying, based on comparing the minimum concentration from the first test with the concentration of the scale inhibitor after the second test, a target fluid for use in a field operation at the subsurface, where the target fluid includes a target concentration of the scale inhibitor and a target chemistry of additional fluid components.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 1A through 1C show a field system, and details thereof, with which example embodiments may be used.

DESCRIPTION OF THE INVENTION

Figure 2:
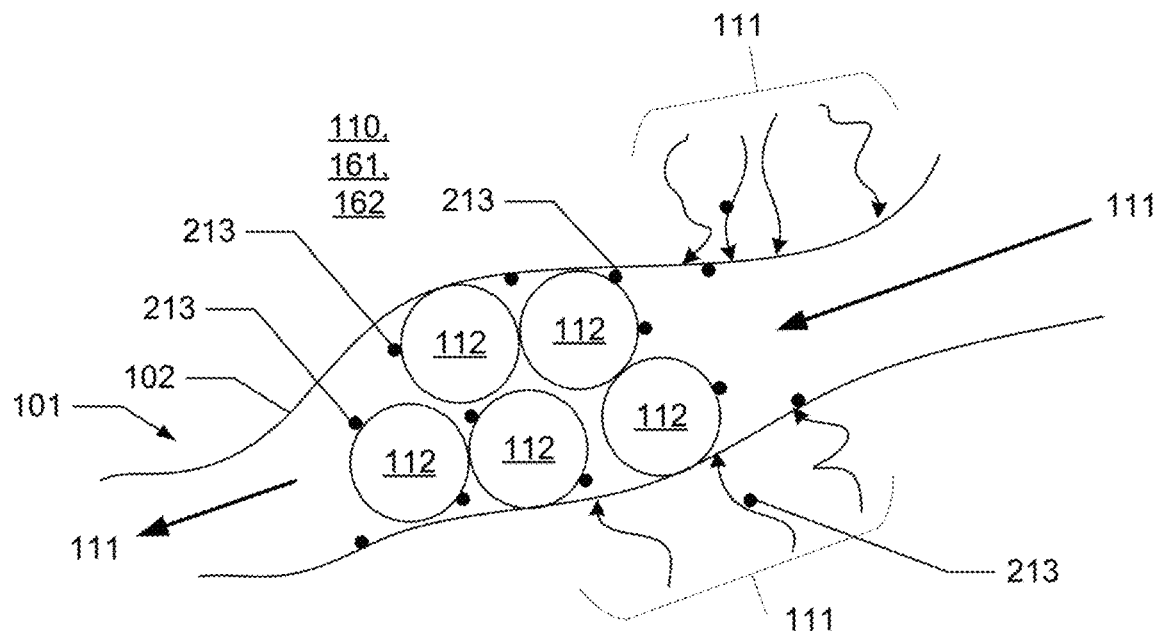
FIG. 2 shows the detail of FIG. 1C at a subsequent point in time according to certain example embodiments.

The example embodiments discussed herein are directed to systems, apparatus, methods, and devices for optimizing scale management at the subsurface for improved well performance. By optimizing scale management (also sometimes referred to as scale inhibitor treatment herein) at the subsurface (e.g., in a fractured subterranean formation), additional subterranean resources may be extracted from the subsurface. Examples of such subterranean resources may include, but are not limited to, oil and natural gas. Creating one or more wellbores with induced fractures and/or using such wellbores with example embodiments may be designed to comply with certain standards and/or requirements. Example embodiments may be used for wellbores drilled in conventional and/or unconventional (e.g., tight shale) subterranean formations and reservoirs.

The use of the terms "about", "approximately", and similar terms applies to all numeric values, whether or not explicitly indicated. These terms generally refer to a range of numbers that one of ordinary skill in the art would consider as a reasonable amount of deviation to the recited numeric values (i.e., having the equivalent function or result). For example, this term may be construed as including a deviation of ±10 percent of the given numeric value provided such a deviation does not alter the end function or result of the value. Therefore, a value of about 1% may be construed to be a range from 0.9% to 1.1%. Furthermore, a range may be construed to include the start and the end of the range. For example, a range of 10% to 20% (i.e., range of 10%-20%) includes 10% and also includes 20%, and includes percentages in between 10% and 20%, unless explicitly stated otherwise herein. Similarly, a range of between 10% and 20% (i.e., range between 10%-20%) includes 10% and also includes 20%, and includes percentages in between 10% and 20%, unless explicitly stated otherwise herein.

A "subterranean formation" refers to practically any volume under a surface. For example, it may be practically any volume under a terrestrial surface (e.g., a land surface), practically any volume under a seafloor, etc. Each subsurface volume of interest may have a variety of characteristics, such as petrophysical rock properties, reservoir fluid properties, reservoir conditions, hydrocarbon properties, or any combination thereof. For example, each subsurface volume of interest may be associated with one or more of: temperature, porosity, salinity, permeability, water composition, mineralogy, hydrocarbon type, hydrocarbon quantity, reservoir location, pressure, etc. Those of ordinary skill in the art will appreciate that the characteristics are many, including, but not limited to: shale gas, shale oil, tight gas, tight oil, tight carbonate, carbonate, vuggy carbonate, unconventional (e.g., a permeability of less than 25 millidarcy (mD) such as a permeability of from 0.000001 mD to 25 mD)), diatomite, geothermal, mineral, etc. The terms "formation", "subsurface formation", "hydrocarbon-bearing formation", "reservoir", "subsurface reservoir", "subsurface area of interest", "subsurface region of interest", "subsurface volume of interest", and the like may be used synonymously. The term "subterranean formation" is not limited to any description or configuration described herein.

A "well" or a "wellbore" refers to a single hole, usually cylindrical, that is drilled into a subsurface volume of interest. A well or a wellbore may be drilled in one or more directions. For example, a well or a wellbore may include a vertical well, a horizontal well, a deviated well, and/or other type of well. A well or a wellbore may be drilled in the subterranean formation for exploration and/or recovery of resources. A plurality of wells (e.g., tens to hundreds of wells) or a plurality of wellbores are often used in a field depending on the desired outcome.

A well or a wellbore may be drilled into a subsurface volume of interest using practically any drilling technique and equipment known in the art, such as geosteering, directional drilling, etc. Drilling the well may include using a tool, such as a drilling tool that includes a drill bit and a drill string. Drilling fluid, such as drilling mud, may be used while drilling in order to cool the drill tool and remove cuttings. Other tools may also be used while drilling or after drilling, such as measurement-while-drilling (MWD) tools, seismic-while-drilling (SWD) tools, wireline tools, logging-while-drilling (LWD) tools, or other downhole tools. After drilling to a predetermined depth, the drill string and the drill bit may be removed, and then the casing, the tubing, and/or other equipment may be installed according to the design of the well. The equipment to be used in drilling the well may be dependent on the design of the well, the subterranean formation, the hydrocarbons, and/or other factors.

A well may include a plurality of components, such as, but not limited to, a casing, a liner, a tubing string, a sensor, a packer, a screen, a gravel pack, artificial lift equipment (e.g., an electric submersible pump (ESP)), and/or other components. If a well is drilled offshore, the well may include one or more of the previous components plus other offshore components, such as a riser. A well may also include equipment to control fluid flow into the well, control fluid flow out of the well, or any combination thereof. For example, a well may include a wellhead, a choke, a valve, and/or other control devices. These control devices may be located on the surface, in the subsurface (e.g., downhole in the well), or any combination thereof. In some embodiments, the same control devices may be used to control fluid flow into and out of the well. In some embodiments, different control devices may be used to control fluid flow into and out of a well. In some embodiments, the rate of flow of fluids through the well may depend on the fluid handling capacities of the surface facility that is in fluidic communication with the well. The equipment to be used in controlling fluid flow into and out of a well may be dependent on the well, the subsurface region, the surface facility, and/or other factors. Moreover, sand control equipment and/or sand monitoring equipment may also be installed (e.g., downhole and/or on the surface). A well may also include any completion hardware that is not discussed separately. The term "well" may be used synonymously with the terms "borehole," "wellbore," or "well bore." The term "well" is not limited to any description or configuration described herein.

In some cases, optimizing scale management at the subsurface for improved well performance may result in reducing deposition of scales and/or other solids. As defined herein, reducing deposition of scales and/or other solids may involve any of a number of different actions. For example, reducing deposition of scales and/or other solids may include minimizing the accumulation or deposition of scales and/or other solids without completely eliminating the scales and/or other solids. As another example, reducing deposition of scales and/or other solids as defined herein may additionally or alternatively mean preventing the development of scale depositions and/or other solids. As yet another example, reducing deposition of scales and/or other solids as defined herein may additionally or alternatively mean completely eliminating scales and/or other solids that have previously developed.

Example embodiments of optimizing scale management may be used for improved well performance may be at a subsurface (e.g., within and adjacent to a wellbore in a subterranean formation). Example embodiments of optimizing scale management at the subsurface for improved well performance may additionally or alternatively be used in any of a number of other applications. For instance, example embodiments may be used to optimize a scale inhibitor for improved performance in surface equipment. Such surface equipment may include, but is not limited to, heat exchangers and conduit or other pipes (e.g., a pipeline, a drainpipe) used to transport fluid (e.g., natural gas).

As defined herein, scale management is based on identifying a fluid, used in a stage (e.g., fracturing, completion) of a field operation, that mixes with another fluid that represents subsurface water. This fluid that is identified includes a scale inhibitor. Example embodiments identify the fluid in light of the type of scale inhibitor, the concentration (amount) of scale inhibitor, and the chemistry of the remainder of the fluid. When example embodiments are designed to identify a fluid that may be used as a fracturing fluid (e.g., fracturing water) in a field operation, the remainder of the fluid may be the fracture fluid. To identify the fluid, a two-phase testing system is employed. Multiple tests are performed in the first phase, and in many cases multiple tests are performed in the second phase.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components. For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C. In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure may be inferred to that component. Conversely, if a component in a figure is labeled but is not described, the description for such component may be substantially the same as the description for the corresponding component in another figure. The numbering scheme for the various components in the figures herein is such that each component is a three-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of optimizing scale management at the subsurface for improved well performance will be described more fully hereinafter with reference to the accompanying drawings, in which example embodiments of optimizing scale management at the subsurface for improved well performance are shown. Optimizing scale management at the subsurface for improved well performance may, however, be embodied in many different forms and should not be construed as limited to the example embodiments set forth herein. Rather, these example embodiments are provided so that this disclosure will be thorough and complete, and will fully convey the scope of optimizing scale management at the subsurface for improved well performance to those of ordinary skill in the art. Like, but not necessarily the same, elements (also sometimes called components) in the various figures are denoted by like reference numerals for consistency.

Terms such as "first", "second", "primary," "secondary," "above", "below", "inner", "outer", "distal", "proximal", "end", "top", "bottom", "upper", "lower", "side", "left", "right", "front", "rear", and "within", when present, are used merely to distinguish one component (or part of a component or state of a component) from another. This list of terms is not exclusive. Such terms are not meant to denote a preference or a particular orientation, and they are not meant to limit embodiments of optimizing scale management at the subsurface for improved well performance. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIGS. 1A through 1C show a field system 199, including details thereof, with which example embodiments may be used. Specifically, FIG. 1A shows a schematic diagram of a land-based field system 199 in which a wellbore 120 has been drilled in a subterranean formation 110. FIG. 1B shows a detail of a substantially horizontal section 103 of the wellbore 120 of FIG. 1A. FIG. 1C shows a detail of an induced fracture 101 of FIG. 1B. The field system 199 in this example includes a wellbore 120 disposed in a subterranean formation 110 using field equipment 109 (e.g., a derrick, a tool pusher, a clamp, a tong, drill pipe, casing pipe, a drill bit, a wireline tool, a fluid pumping system) located above a surface 108 and within the wellbore 120. Once into the wellbore 120 is drilled, a casing string 125 is inserted into the wellbore 120 to stabilize the wellbore 120 and allow for the extraction of subterranean resources (e.g., natural gas, oil) from the subterranean formation 110.

The surface 108 may be ground level for an onshore application and the sea floor (or other similar floor under a body of water) for an offshore application. A body of water may include, but it not limited to, sea water, brackish water, flowback or produced water, wastewater (e.g., reclaimed or recycled), brine (e.g., reservoir or synthetic brine), fresh water (e.g., fresh water comprises <1,000 ppm TDS water), any other type of water, or any combination thereof. For offshore applications, at least some of the field equipment may be located on a platform that sits above the water level. The point where the wellbore 120 begins at the surface 108 may be called the wellhead. While not shown in FIGS. 1A and 1B, there may be multiple wellbores 120, each with its own wellhead but that is located close to the other wellheads, drilled into the subterranean formation 110 and having substantially horizontal sections 103 that are close to each other. In such a case, the multiple wellbores 120 may be drilled at the same pad or at different pads. When the drilling process is complete, other operations, such as fracturing operations, may be performed. The fractures 101 are shown to be located in the horizontal section 103 of the wellbore 120 in FIG. 1B. The fractures 101, whether induced and/or naturally occurring, may additionally or alternatively be located in other sections (e.g., a substantially vertical section, a transition area between a vertical section and a horizontal section) of the wellbore 120. In some cases, a wellbore 120 has no substantially horizontal sections. Example embodiments may be used along any portion of the wellbore 120 where fractures 101 are located.

The subterranean formation 110 may include one or more of a number of formation types, including but not limited to shale, limestone, sandstone, clay, sand, and salt. In certain embodiments, a subterranean formation 110 may include one or more reservoirs in which one or more resources (e.g., oil, natural gas, water, steam) may be located. One or more of a number of field operations (e.g., fracturing, coring, tripping, drilling, setting casing, extracting downhole resources) may be performed to reach an objective of a user with respect to the subterranean formation 110.

The wellbore 120 may have one or more of a number of segments or hole sections, where each segment or hole section may have one or more of a number of dimensions. Examples of such dimensions may include, but are not limited to, a size (e.g., diameter) of the wellbore 120, a curvature of the wellbore 120, a total vertical depth of the wellbore 120, a measured depth of the wellbore 120, and a horizontal displacement of the wellbore 120. There may be multiple overlapping casing strings of various sizes (e.g., length, outer diameter) contained within and between these segments or hole sections to ensure the integrity of the wellbore construction. In this case, one or more of the segments of the subterranean wellbore 120 is the substantially horizontal section 103.

As discussed above, inserted into and disposed within the wellbore 120 of FIGS. 1A and 1B are a number of casing pipes that are coupled to each other end-to-end to form the casing string 125. In this case, each end of a casing pipe has mating threads (a type of coupling feature) disposed thereon, allowing a casing pipe to be directly or indirectly mechanically coupled to another casing pipe in an end-to-end configuration. The casing pipes of the casing string 125 may be indirectly mechanically coupled to each other using a coupling device, such as a coupling sleeve.

Each casing pipe of the casing string 125 may have a length and a width (e.g., outer diameter). The length of a casing pipe may vary. For example, a common length of a casing pipe is approximately 40 feet. The length of a casing pipe may be longer (e.g., 60 feet) or shorter (e.g., 10 feet) than 40 feet. The width of a casing pipe may also vary and may depend on the cross-sectional shape of the casing pipe. For example, when the shape of the casing pipe is cylindrical, the width may refer to an outer diameter, an inner diameter, or some other form of measurement of the casing pipe. Examples of a width in terms of an outer diameter may include, but are not limited to, 4½ inches, 7 inches, 7⅝ inches, 8⅝ inches, 10¾ inches, 13⅜ inches, and 14 inches.

The size (e.g., width, length) of the casing string 125 may be based on the information (e.g., diameter of the borehole drilled) gathered using field equipment with respect to the subterranean wellbore 120. The walls of the casing string 125 have an inner surface that forms a cavity that traverses the length of the casing string 125. Each casing pipe may be made of one or more of a number of suitable materials, including but not limited to steel. Cement is poured into the wellbore 120 through the cavity and then forced upward between the outer surface of the casing string 125 and the wall of the subterranean wellbore 120. In some cases, a liner may additionally be used with, or alternatively be used in place of, some or all of the casing pipes.

Once the cement dries to form concrete, a number of fractures 101 are induced in the subterranean formation 110. The fractures 101 may be induced in any of a number of ways known in the industry, including but not limited to hydraulic fracturing, fracturing using electrodes, and/or other methods of inducing fractures. The hydraulic fracturing process involves the injection of large quantities of fluids containing water, chemical additives, and proppant 112 into the subterranean formation 110 from the wellbore 120 to create fracture networks. An example of fracturing using electrodes may be found in U.S. Pat. No. 9,840,898 issued on Dec. 12, 2017, to Kasevich et al., the entirety of which is herein incorporated by reference. A subterranean formation 110 naturally has fractures 101, but these naturally occurring fractures 101 have inconsistent characteristics (e.g., length, spacing) and so in some cases cannot be relied upon for extracting subterranean resources without having additional fractures 101, such as what is shown in FIG. 1B, induced in the subterranean formation 110.

Induced fractures 101 typically propagate toward lower stress rock and in the direction perpendicular to the current (at the time of a fracturing operation) least principal horizontal stress. Operations that induce fractures 101 in the subterranean formation 110 use any of a number of fluids that include proppant 112 (e.g., sand, ceramic pellets). When proppant 112 is used, some of the fractures 101 (also sometimes called principal or primary fractures) receive proppant 112, while a remainder of the fractures 101 (also sometimes called secondary fractures) do not have any proppant 112 in them.

As shown in FIG. 1C, the proppant 112 is designed to become lodged inside at least some of the induced fractures 101 to keep those fractures 101 open after the fracturing operation is complete. The size of the proppant 112 is an important design consideration. Sizes (e.g., 40/70 mesh, 50/140 mesh) of the proppant 112 may vary. While the shape of the proppant 112 is shown as being uniformly spherical, and the size is substantially identical among the proppant 112, the actual sizes and shapes of the proppant 112 may vary. If the proppant 112 is too small, the proppant 112 will not be effective at keeping the fractures 101 open enough to effectively allow subterranean resources 111 to flow through the fractures 101 from the rock matrices 162 in the subterranean formation 110 to the wellbore 120. If the proppant 112 is too large, the proppant 112 may plug up the fractures 101, blocking the flow of the subterranean resources 111 through the fractures 101.

The use of proppant 112 in certain types of subterranean formation 110, such as shale, is important. Shale formations typically have permeabilities on the order of microdarcys (mD) to nanodarcys (nD). When fractures 101 are induced in such formations with low permeabilities, it is important to sustain the fractures 101 and their permeability and conductivity for an extended period of time in order to extract more of the subterranean resource 111.

The various induced fractures 101 that originate at the wellbore 120 and extend outward into the rock matrices 162 in the subterranean formation 110 in this case have consistent penetration lengths perpendicular to the wellbore 120 and have consistent coverage along at least a portion of the lateral length (substantially horizontal section) of the wellbore 120. For example, induced fractures 101 may be 50 meters high and 200 meters long. Further, the induced fractures 101 may be spaced a distance 192 apart from each other. The distance 192 (e.g., 25 meters, 5 meters, 12 meters) may be optimized based on the permeability and the porosity of the rock matrix 162 of the subterranean formation 110.

The induced fractures 101 create a volume 190 within the subterranean formation 110 where the rock matrix 162 of the subterranean formation 110 is connected to the high conductivity fractures 101 located a short distance away. In addition to different configurations of the fractures 101, other factors that may contribute to the viability of the subterranean formation 110 may include, but are not limited to, permeability of the rock matrix 162, capillary pressure, and the temperature and pressure of the subterranean formation 110. Each fracture 101, whether induced or naturally occurring, is defined by a wall 102, also called a fracture face 102 herein. The fracture face 102 provides a transition between the paths formed by the rock matrices 162 in the subterranean formation 110 and the fracture 101. The subterranean resources 111 flow through the paths formed by the rock matrices 162 in the subterranean formation 110 into the fracture 101.

The rock matrices 162, as well as the rest of the subterranean formation 110, both without and outside the volume 190, have a certain amount of formation water 161 therein. The formation water 161 may be or include, for example, formation water from the formation matrix within the volume 190, moveable free formation water, and "external" water from non-targeted formation/sources (e.g., outside the target volume 190). These sources of formation water 161 may include water from nearby saltwater disposal wells. The formation water 161 may migrate from outside a target volume 190 through other fractures, faults, lineaments, other features of the subterranean formation 110, or any combination thereof.

The formation water 161 may have any of a number of different components (e.g., minerals, acids) in addition to water. The contents of formation water 161 in one part (e.g., outside the volume 190) of the subterranean formation 110 may be the same as, or different than, the contents of the formation water 161 in other parts (e.g., in the rock matrices 162) of the subterranean formation 110. In some cases, such as during a stage (e.g., a hydraulic fracturing stage) of a field operation, the fluids (e.g., fracturing fluid) used in that stage may mix with the formation water 161, thereby changing the contents or composition of the in situ water chemistry in parts (e.g., at or near the fractures 101) of the subterranean formation 110. The formation water 161 may include one or more of a number of types of water, including but not limited to sea water, brackish water, flowback or produced water, wastewater (e.g., reclaimed or recycled), brine (e.g., reservoir or synthetic brine), fresh water (e.g., fresh water comprises <1,000 ppm TDS water), any other type of water, or any combination thereof.

Figure 3:
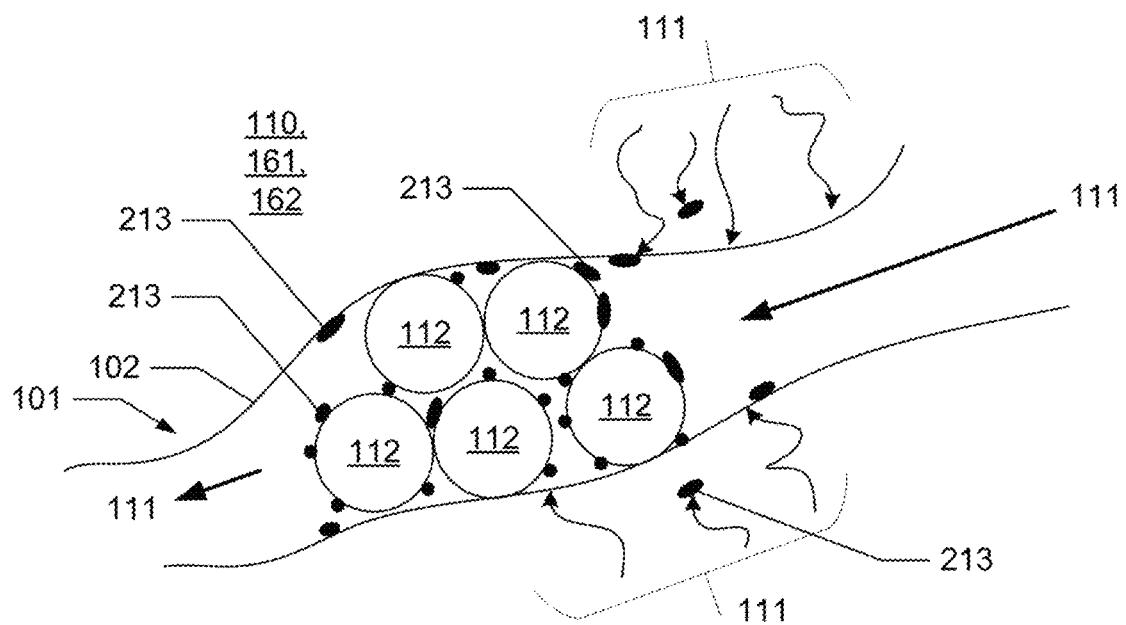
FIG. 3 shows the detail of FIG. 2 at a subsequent point in time according to certain example embodiments.

FIG. 2 shows the detail of FIG. 1C at a subsequent point in time according to certain example embodiments. FIG. 3 shows the detail of FIG. 2 at a subsequent point in time according to certain example embodiments. For example, FIG. 2 may show the detail of FIG. 1C six months later (e.g., at the initial stage when the well is put on production) than the time captured in FIG. 1C after flowing a fluid having a scale enhancer (either naturally occurring in the fluid or added to the fluid) therethrough, and FIG. 3 may show the detail of FIG. 2 three months later than the time captured in FIG. 2 after continuing to flow the fluid having the scale enhancer therethrough. A scale enhancer may be a chemical or other additive that stimulates scale deposition. Referring to FIGS. 1A through 3, the detail in FIG. 2 shows, in addition to the proppant 112 within the fracture 101, a subterranean resource 111 (e.g., natural gas, oil) is shown flowing within the fracture 101 from the rock matrix 162, around the proppant 112 in the fracture 101, and on to the wellbore 120. In some cases, the subterranean resource 111 is co-present or mixed with the formation water 161.

As the subterranean resource 111 flows within the paths formed by the rock matrices 162 and around the proppant 112 in the fracture 101, scale depositions 213 may occur (e.g., scale particles formed during the shut-in stage before the well is put on production) within the rock matrices 162, on the proppant 112, and/or on the fracture face 102. Over time, the scale depositions 213 may begin to accumulate on the rock matrices 162, on the proppant 112, and/or on the fracture face 102. Each of the scale depositions 213 is an inorganic deposit from ionic materials in water (e.g., the formation water 161) that attaches to solid surfaces. Hydrocarbons may be adsorbed on scale depositions 213. Under field conditions, scale depositions 213 may be a mixture of inorganic and organic components.

Scale depositions 213 may be initiated during a prior phase (e.g., completion) of a field operation, where fluids and chemicals used downhole may interact with formation rock (e.g., the fracture face 102, the rock matrices 162) and comingle with the formation water 161 in and/or near perforations and along the fractures 101, resulting in the mobilization and release of elements from the rock matrices 162 adjacent to the fractures 101. Later, in a subsequent phase (e.g., shutting in) of the field operation, the rock-fluid interaction and the commingling of different fluids may lead to the formation (crystallization) and growth of scale depositions 213 in or near the perforations, the rock matrices 162, and the fractures 101. In yet another subsequent phase (e.g., production) of the field operation, the degradation in the conductivity and production flow path integrity over time in the rock matrices 162 and the fractures 101, caused by agglomerate build-up of scale depositions 213, may lead to plugging in or near the perforations, rock matrices 162, fractures 101, and completion tools.

The scale depositions 213 that accumulate within the rock matrices 162 and the fractures 101 may be composed of one or more of any of a number of compounds, including but not limited to calcium carbonate ($CaCO_3$), barium sulfate ($BaSO_4$), calcium sulfate ($CaSO_4$), strontium sulfate ($SrSO_4$), iron carbonate ($FeCO_3$), iron oxide ($Fe_2O_3$), iron sulfide (FeS), zinc sulfide (ZnS), other oxides, other sulfides, other carbonates, other sulfates, halides, and hydroxides. While the scale depositions 213 may additionally or alternatively be composed of other compounds (e.g., gas hydrates, organic deposits (e.g., asphaltenes, waxes, acid induced accumulations), and naphthenates), example embodiments focus on the reduction of scale depositions 213 caused by inorganic deposits. The scale depositions 213 may be caused by one or more of any of a number of factors, including but not limited to supersaturation, mixing incompatible ions, changes in temperature, changes in pressure, and a change in the pH of water in the fluid.

Scale depositions 213 may form during the shut-in stage prior to the well being put into production, as shown in FIG. 2. In such a case, the scale depositions 213 disposed on the rock matrices 162, on the proppant 112, and on the fracture face 102 are small and spotty. As a result, the scale depositions 213 do not contribute much to inhibiting the flow of the subterranean resource 111 through the paths within the rock matrices 162 and around the proppant 112 within the fracture 101 formed by the fracture face 102. In the portion of the fracture 101 shown at the time captured in FIG. 2, there are 2 separate scale depositions 213 within the rock matrices 162, 8 scale depositions 213 on the proppant 112, and 4 scale depositions 213 on the fracture face 102. The number, size, and location of the scale depositions 213 within the rock matrices 162 and the fracture 101 may vary.

When the well is put on production, some scale depositions 213 may stay at their original position, while some scale particles may move/migrate together with the produced water and deposit at another location along the production pathway. As more water is produced, the existing scale depositions 213 may increase in size and new scale depositions 213 may develop over time. An example of this is captured in FIG. 3, which shows that the scale depositions 213 become larger and less spotty. As a result, the scale depositions 213 in FIG. 3 begin to contribute to inhibit the flow of the subterranean resource 111 along the paths formed by the rock matrices 162, through the fracture face 102 (impacting migration of the subterranean resource 111 from the rock matrix 162), and around the proppant 112 (combined with the scale depositions 213 on the proppant 112 and on the fracture face 102) within the fracture 101.

As a result, scale depositions 213 may cause a decrease (in some cases, a significant decrease) in well productivity and estimated ultimate recovery (EUR) for the well. In the portion of the fracture 101 shown at the time captured in FIG. 3, there are 25 separate scale depositions 213 within the rock matrices 162, at the fracture face 102, and on the proppant 112, many of which are larger (in some cases, significantly larger) than the size of the scale depositions 213 shown in FIG. 2. Also, some of the scale depositions 213 in FIG. 3 have migrated to a new location relative to their location in FIG. 2. Again, the number, size, and location of the scale depositions 213 within the fracture 101 may vary.

In field operations in the current art, scale inhibitor (e.g., 0.023%) is commonly included in fracture fluid to inhibit/control mineral scale depositions (a form of scale depositions 213) during hydraulic fracturing operations. As fracture fluid is injected into the subsurface, it may interact with the fracture face 102, proppant, rock matrices, formation water, and other elements in the volume 190. Rock-water interaction and fluid commingling may potentially lead to increased risk of scale depositions 213 and solid formation (e.g., create other types of blockage in the fractures 101), leading to adverse effects (e.g., create other types of blockage in the fractures 101) on production performance. In some cases, excessive amounts or inappropriate application of scale inhibitor may lead to increased risk in the development of scale depositions 213, corrosion, incompatibility, and other production issues.

There has been uncertainty whether the scale inhibitor included in fracture fluid (also sometimes called fracking fluid, fracture water, or fracking water herein) may reduce/prevent scale depositions 213 at the subsurface during the shut-in stage of a field operation prior to the production stage of the field operation. It is important to optimize scale management (e.g., selecting the optimal scale inhibitor among a number of different scale inhibitors, determining the appropriate concentration of the optimal scale inhibitor in fracture fluid, determining the optimal fracture fluid chemistry) in the completion stage using example embodiments in one part (e.g., fracturing) of a field operation in order to increase/optimize recovery of subterranean resources from a subterranean formation in a subsequent part (e.g., production) of the field operation. For instance, example embodiments may be used to assess the impact of fluids and chemical additives placed into a subterranean formation on in situ water chemistry and scale/solids formation risk at the subsurface during a completion phase of a field operation.

It should also be noted that scale may accumulate during other phases of a field operation. For example, during exploration (e.g., drilling, completion) of a well (e.g., well 120), scale may develop and accumulate in the porous media along the fracture face 102. In such cases, drilling and completion fluids are circulated within the wellbore 120, and some of these fluids enter the fractures 101. These fluids then interact with the fluids in the formation (e.g., formation water) and/or the fracture face 102 to result in scale development and accumulation. As another example, during a shut-in period (e.g., between completion and production), rock-fluid interaction within the fractures 101 may result in scale formation in porous media near the fracture face 102 to result in scale development and accumulation.

Example embodiments are designed to assess scaling risk at the subsurface as well as the impact of fluids and chemical additives by taking visual observations and/or analyzing the post-reaction composition of various fluids (e.g., synthetic brines that simulate field brines such as fracture fluid, formation waters 161, and other potential water sources) that may be present within a volume 190 of known composition and determine a fluid that both enhances production of the subterranean resource 111 within the volume 190 in its original form and also minimizes adverse effects on the enhanced production of the subterranean resource 111 within the volume 190 in its post-reaction/mixing form. Example embodiments are also designed to determine the optimal way to use a fluid, both in its original form and in its post-reaction/mixing form, to enhance production in the volume 190 by mitigating the adverse effects that could develop from one or more components of the post-reaction form of the fluid in that particular field operation.

Figure 4:
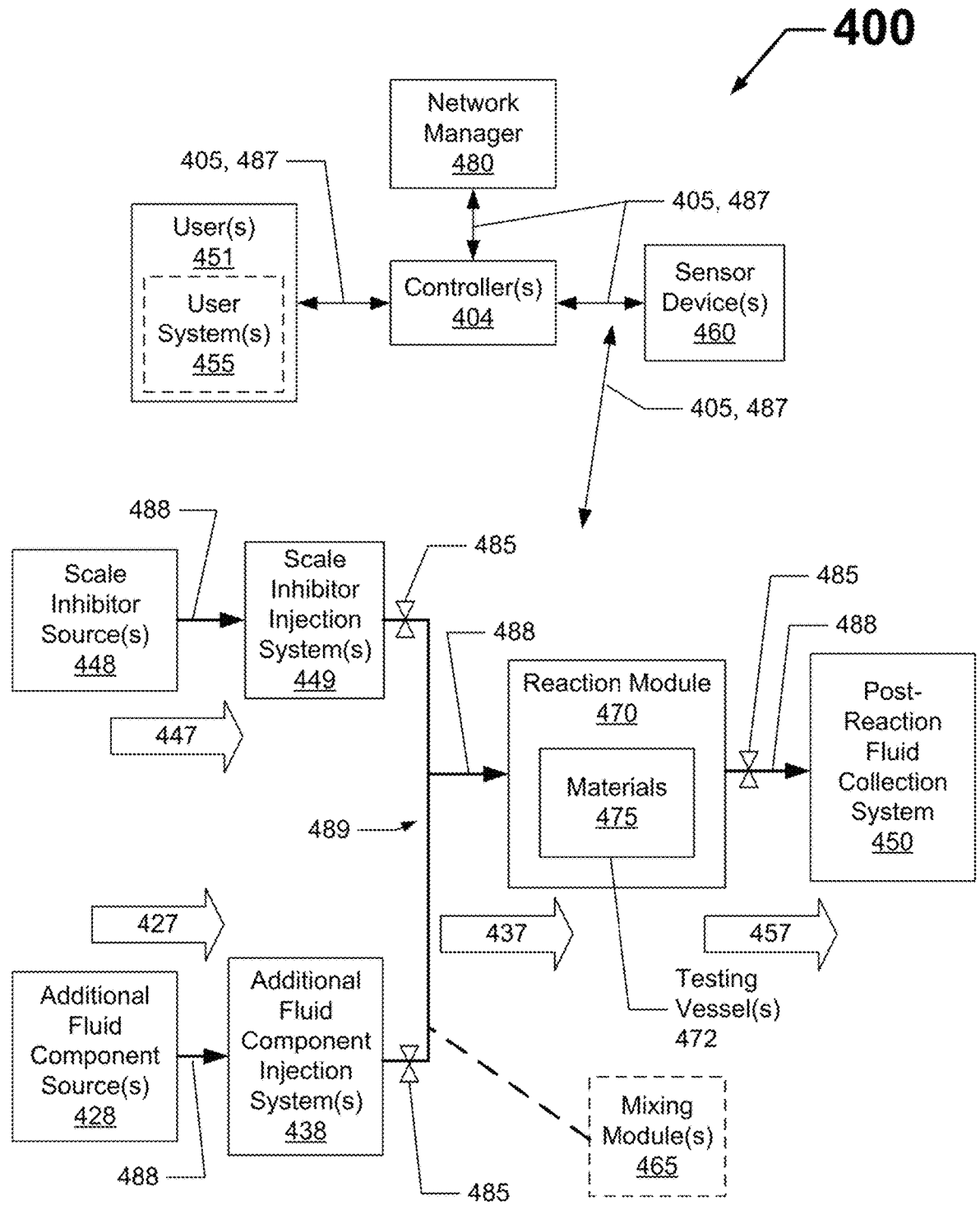
FIG. 4 shows a diagram of a testing system for optimizing scale management at the subsurface for improved well performance according to certain example embodiments.

FIG. 4 shows a diagram of a system 400 for optimizing a scale inhibitor at the subsurface for improved well performance according to certain example embodiments. The system 400 of FIG. 4 includes one or more additional fluid component sources 428, one or more scale inhibitor sources 448, one or more additional fluid component injection systems 438, one or more scale inhibitor injection systems 449, a reaction module 470, a post-reaction fluid collection system 450, one or more optional mixing modules 465, one or more controllers 404, one or more sensor devices 460, one or more users 451 (including one or more optional user systems 455), a network manager 480, piping 488, and one or more valves 485. The reaction module 470 includes a testing vessel 472.

The components shown in FIG. 4 are not exhaustive, and in some embodiments, one or more of the components shown in FIG. 4 may not be included in the example testing system 400. Any component of the testing system 400 may be discrete or combined with one or more other components of the testing system 400. Also, one or more components of the testing system 400 may have different configurations. For example, one or more sensor devices 460 may be disposed within or disposed on other components (e.g., the piping 488, a valve 485, the reaction module 470, the post-reaction fluid collection system 450). As another example, a controller 404, rather than being a stand-alone device, may be part of one or more other components (e.g., reaction module 470, the post-reaction fluid collection system 450, an injection system 438) of the testing system 400.

Referring to FIGS. 1A through 4, a fluid 437 (in this case, a fluid in at least partially liquid form) is pushed to, and in some cases through, the testing vessel 472 of the reaction module 470 to interact with the material 475 inside the testing vessel 472. In some cases, as during some first phase tests, there may be no materials 475 in the testing vessel 472. Instead, in such cases, the testing vessel 472 hosts fluids 437, and so interaction between the scale inhibitor 447 and the additional fluid components 427 (e.g., brines) is observed and/or tested. The fluid 437 (e.g., a fracture fluid) may be made up of one or more scale inhibitors 447 (also sometimes called scale inhibitor treatments 447 herein) and one or more additional fluid components 427 (e.g., water, chlorine, boron, fluoride) that are mixed together before reaching the reaction module 470. A scale inhibitor 447 and/or a fluid component 427 may be in solid, liquid, and/or gaseous form. One or more of the scale inhibitors 447 and/or one or more of the additional fluid components 427 may be mixed together in the piping 488 at a header 489 as those one or more scale inhibitors 447 and one or more additional fluid components 427 interact with each other to form a fluid 437 and flow toward the reaction module 470.

Alternatively, the testing system 400 may include one or more of the optional mixing modules 465 that mix one or more scale inhibitors 447 and/or one or more additional fluid components 427 together before the one or more scale inhibitors 447 and/or one or more additional fluid components 427 reach the reaction module 470 as a fluid 437. A mixing module 465 may include one or more of a number of features used to mix one or more scale inhibitors 447 and/or one or more additional fluid components 427 together. Such features may include, but are not limited to, a vessel, a sensor device 460, a controller 404, an agitator, a paddle, a circulating system, an aerator, a vibrating mechanism, and a centrifuge. A mixing module 465 and the header 489 may each be referred to as a common vessel herein.

There may be one or more scale inhibitor sources 448. Each scale inhibitor source 448 may hold one or more scale inhibitors 447. Each scale inhibitor 447 may be or include a fluid. A single scale inhibitor 447 or a mixture of multiple scale inhibitors 447 (but not the fluid 437) may be disposed in a scale inhibitor source 448. A scale inhibitor 447 is a specialty chemical that is added to a fluid to delay, reduce, and/or prevent scale deposition 213. Examples of a scale inhibitor 447 may include, but are not limited to, acrylic acid polymers, maleic acid polymers, phosphonates, Poly-Phosphono Carboxylic acid (PPCA), and Diethylenetri-amine-penta (methylene phosphonic acid) (DTPMP).

There may be one or more additional fluid component sources 428. Each additional fluid component source 428 may hold one or more additional fluid components 427. Each additional fluid component 427 (e.g., formation water, non-formation water, proppant, a field additive, a chemical additive) may be or include a fluid. A single additional fluid component 427 or a mixture of multiple additional fluid components 427 (but not the fluid 437) may be disposed in an additional fluid component source 428. In certain example embodiments, at least one of the fluid components 427 is a scale inhibitor, and each fluid 437 includes the scale inhibitor in some concentration.

To control the composition of the fluid 437 at a given point in time, the amount of the individual scale inhibitor(s) 447 and the fluid component(s) 427 that are released or withdrawn from the scale inhibitor source(s) 448 and the fluid component source(s) 428, respectively, may be regulated in real time. This regulation may be performed automatically by a controller 404 or manually by a user 451 (which may include an associated user system 455). This regulation may be performed using equipment such as the injection systems 438, valves 485, regulators, sensor devices 460, and meters. Generally, a scale inhibitor source 448 may include a man-made storage tank or vessel. An additional fluid component source 428 may include, but are not limited to, a natural vessel (e.g., land that forms a body of water) and a man-made storage tank or other vessel. A scale inhibitor 447 of a scale inhibitor source 448 and an additional fluid component 427 of an additional fluid component source 428 may have any of a number of different compositions that are naturally occurring or man-made. In some cases, an additional fluid component 427 of the fluid 437 includes water (e.g., formation water, non-formation water). In addition, or in the alternative, an additional fluid component 427 of the fluid 437 may include a fracturing fluid (e.g., fracturing water) that includes proppant, field additives, and/or chemical additives.

Each scale inhibitor injection system 449 is configured to extract a scale inhibitor 447 from a scale inhibitor source 448 and push the scale inhibitor 447 toward the reaction module 470. The number of scale inhibitor injection systems 449 in the testing system 400 may vary. In some embodiments, there may be one scale inhibitor injection system 449 for each scale inhibitor source 448. In alternative embodiments, there may be one scale inhibitor injection system 449 for multiple scale inhibitor sources 448. Each scale inhibitor injection system 449 may include one or more of a number of pieces of equipment to perform its function. Examples of such equipment may include, but are not limited to, a compressor, a motor, a pump, piping (e.g., piping 488), a valve (e.g., valve 485), a controller (e.g., controller 404), and a sensor device (e.g., sensor device 460). In addition, or in the alternative, one or more users 451 may perform the various functions required to conduct one or more tests.

Each additional fluid component injection system 438 is configured to extract an additional fluid component 427 from an additional fluid component source 428 and push the additional fluid component 427 toward the reaction module 470. The number of additional fluid component injection systems 438 in the testing system 400 may vary. In some embodiments, there may be one additional fluid component injection system 438 for each additional fluid component source 428. In alternative embodiments, there may be one additional fluid component injection system 438 for multiple additional fluid component sources 428. Each additional fluid component injection system 438 may include one or more of a number of pieces of equipment to perform its function. Examples of such equipment may include, but are not limited to, a compressor, a motor, a pump, piping (e.g., piping 488), a valve (e.g., valve 485), a controller (e.g., controller 404), and a sensor device (e.g., sensor device 460).

The piping 488 (including the header 489) may include multiple pipes, ducts, elbows, joints, sleeves, collars, and similar components that are coupled to each other (e.g., using coupling features such as mating threads) to establish a network for transporting the one or more scale inhibitors 447 from the one or more scale inhibitor sources 448 and the one or more additional fluid components 427 from the one or more fluid component sources 428, through the one or more scale inhibitor injection systems 449 and the one or more additional fluid component injection systems 438, respectively, to the header 489 (where the one or more scale inhibitors 447 and the one or more additional fluid components 427 mix together to form a fluid 437), to the reaction module 470, and finally from the reaction module 470 to the post-reaction fluid collection system 450. Each component of the piping 488 may have an appropriate size (e.g., inner diameter, outer diameter) and be made of an appropriate material (e.g., steel, PVC) to safely and efficiently handle the pressure, temperature, flow rate, and other characteristics of the scale inhibitors 447, the fluid components 427, and/or the fluid 437, as applicable.

There may be a number of valves 485 placed in-line with the piping 488 at various locations (including at the header 489) in the testing system 400 to control the flow of each scale inhibitor 447, each additional fluid component 427, and/or each fluid 437 therethrough. A valve 485 may have one or more of any of a number of configurations, including but not limited to a guillotine valve, a ball valve, a gate valve, a butterfly valve, a pinch valve, a needle valve, a plug valve, a diaphragm valve, and a globe valve. One valve 485 may be configured the same as or differently compared to another valve 485 in the testing system 400. Also, one valve 485 may be controlled (e.g., manually, automatically by the controller 404) the same as or differently compared to another valve 485 in the testing system 400.

The reaction module 470 is configured to house one or more testing vessels 472. In some cases, the reaction module 470 receives a fluid 437 from the header 489, runs the fluid 437 through a testing vessel 472, and sends the post-reaction fluid 457 to the post-reaction fluid collection system 450. In alternative embodiments, the post-reaction fluid collection system 450 is omitted from the testing system 400, and so some or all of the contents of the testing vessel 472 are analyzed. In certain example embodiments, the testing vessels 472 are passive objects that have a fluid 437 pass through them without the testing vessels 472 being modified or without taking action during this process. The reaction module 470 may control various aspects (e.g., temperature, pressure, flow rate) of the fluid 437 and/or the testing vessel 472. In some cases, the reaction module 470 is designed to subject the materials 475 in the testing vessel 472 to conditions (e.g., pressure, temperature, flow rate) that simulate the conditions at the subsurface (e.g., corresponding downhole conditions of the fractures 101 and rock matrix in the subterranean formation 110 adjacent to the wellbore 120). The reaction module 470 may include one or more of a number of pieces of equipment to perform these functions. Examples of such equipment may include, but are not limited to, a motor, a pump, a compressor, piping (e.g., piping 488), a valve (e.g., valve 485), a controller (e.g., controller 404), and a sensor device (e.g., sensor device 460).

A testing vessel 472 is a vessel (e.g., a bottle, a column, a test tube) inside of which various materials 475 (e.g., fracture fluid, formation water 161, rock, proppant 112) are disposed. The materials 475 in a testing vessel 472 are designed to simulate or replicate fluids (e.g., fracture fluid/formation water mixture) and/or conditions (e.g., induced fractures 101 in a subterranean formation 110 adjacent to a wellbore 120) at the subsurface. In some cases, the materials 475 placed in a testing vessel 472 are taken from the subterranean formation 110. For example, formation water (e.g., from targeted or non-targeted formations, shale water, moveable water sources from the subsurface) may be some or all of the materials 475 placed in a testing vessel 472. As another example, cuttings or other loose rock that circulate to the surface 108 during a field operation (e.g., drilling, completion) may be removed from the mud circulating system (part of the field equipment 109) and placed in a testing vessel 472. As yet another example, a core sample may be taken of the subterranean formation 110 by a tool (e.g., a wireline tool) placed in the wellbore 120 adjacent to the induced fractures 101. In such a case, the core sample may be retrieved from the tool when the tool is brought to the surface 108 and subsequently placed in a testing vessel 472. As still another example, proppant 112 used to prop open the induced fractures 101 adjacent to the wellbore 120 may be used as some of the materials 475 in the testing vessel 472.

In some cases, the reaction module 470 may be configured to simulate downhole conditions. In any case, the material 475 in the testing vessel 472 is mixed with a fluid 437 that flows through the materials 475 in the testing vessel 472. In order to accomplish this, the testing vessel 472 may be made of any of a number of appropriate material (e.g., glass, polytetrafluoroethylene-lined stainless steel) that may withstand the conditions (e.g., pressure, temperature, acidity) simulated by the reaction module 470. After a period of time, the testing process may be paused or stopped so that the materials 475 in the testing vessel 472 and the post-reaction fluid 457 in the post-reaction fluid collection system 450 may be evaluated. In some example embodiments, the fluid 437 may be designed to eliminate or reduce scaling that may appear and grow in the testing vessel 472, which contains materials 475 (e.g., formation water 161, fracture fluid, synthetic brines that are representative of formation water, the proppant 112 and/or rock). In addition, or in the alternative, the fluid 437 may be designed to clear perforations and/or otherwise enhance production of the subterranean resource 111 from the volume 190.

Evaluation of the materials 475 in the testing vessel 472 may include determining the amount of scale depositions 213 disposed on or within the formation water, the proppant 112, rock, and/or other materials 475 in a testing vessel 472 over time. This evaluation may then be correlated, directly or indirectly, to how effective the fluid 437 used during that phase of testing may be at reducing or eliminating scale depositions 213 in the induced fractures 101 adjacent to the wellbore 120. In some cases, an evaluation of the post-reaction fluid 457 in the post-reaction fluid collection system 450 may also be performed. Such an evaluation of the post-reaction fluid 457 in the post-reaction fluid collection system 450 may determine the impact of these added chemistry components on the materials 475, which may translate to the impact of these added chemistry components on well production performance after flowing the fluid 437 through the fractures 101 and rock matrices in the volume 190 of the subterranean formation 110.

The goal of a fluid 437 herein is to optimize a scaling inhibitor treatment 447 (e.g., in terms of the specific type of scaling inhibitor 447, in terms of the concentration of the scale inhibitor 447) in the fluid 437 so that scale depositions 213 at the subsurface are eliminated/minimized and so that the ultimate production of subterranean resources 111 from the subterranean formation 110 is maximized. The reaction module 470 also be used for any of a number of other purposes, including but not limited to demonstrating that a particular fluid 437 decreases formation of scale depositions 213 and other blockage in the materials 475 within the testing vessel 472, determining the interaction between a fluid 437 and the materials 475 versus the accumulation of scale depositions 213, and determining the interaction between a fluid 437 and debris from fractures 101 versus the interaction between the fluid 437 and proppant 112/rock in the materials 475. In some cases, example embodiments analyze the post-reaction fluid 457 that gathers in the post-reaction fluid collection system 450 reaction module.

In some cases, the reaction module 470 may include one or more features (e.g., a spectrograph, a gas chromatograph, a camera with a high zoom lens, a controller 404, one or more sensor devices 460) that perform some or all of the evaluation of materials 475 within a testing vessel 472 that have been tested. The testing vessel 472 may be removable (e.g., by a user 451) from and insertable into the reaction module 470. The reaction module 470 may include one or more features (e.g., a clamp, a latched lid) that ensure that a testing vessel 472 is secure within the reaction module 470.

The post-reaction fluid collection system 450 is configured to receive the post-reaction fluid 457, which is the byproduct of the fluid 437 that has flowed through and/or otherwise interacted with the materials 475 in one or more testing vessels 472 of the reaction module 470. The post-reaction fluid collection system 450 may include a vessel to contain some or all of the post-reaction fluid 457. In certain example embodiments, the post-reaction fluid collection system 450 is configured to simulate downhole conditions. In order to accomplish this, the part of the post-reaction fluid collection system 450 that receives the post-reaction fluid 457 may be made of any of a number of appropriate material (e.g., glass, polytetrafluoroethylene-lined stainless steel) that may withstand the conditions (e.g., pressure, temperature) simulated by the post-reaction fluid collection system 450.

In some cases, the post-reaction fluid collection system 450 may also be configured to perform one or more tests on the post-reaction fluid 457. In such cases, the post-reaction fluid collection system 450 may include one or more of a number of features (e.g., a motor, a pump, a compressor, piping (e.g., piping 488), a valve (e.g., valve 485), a spectrograph, a gas chromatograph, a camera with a high zoom lens, a controller 404, one or more sensor devices 460) to conduct such testing.

As a result of the testing on the post-reaction fluid 457, such as during a second phase test (discussed below) herein, the post-reaction fluid collection system 450 may determine or reveal an amount of scale inhibitor 447 and cations/anions/elements/compounds (one or more additional fluid components 427) in aqueous form (e.g., that has not been adsorbed by the rock) that is in the post-reaction fluid 457. In alternative embodiments, the post-reaction fluid 457 is what remains in aqueous form in the testing vessel 472 of the reaction module 470 after some period of time and is not transferred to the post-reaction fluid collection system 450. In some cases, as during the first phase tests (discussed below) herein, the post-reaction fluid collection system 450 (or the reaction module 470 if the post-reaction fluid 457 is not transferred to the post-reaction fluid collection system 450) may be used to determine whether scale formation has occurred or reveal the amount of scale depositions 213 that develops as a fluid 437 interacts with the materials 475 in a testing vessel 472 of the reaction module 470.

In some cases, the post-reaction fluid collection system 450 (or the reaction module 470 if the post-reaction fluid 457 is not transferred to the post-reaction fluid collection system 450) may also include one or more of the materials 475 to determine the effectiveness of a scale inhibitor 447 (e.g., in terms of concentration, in terms of type) in a fluid 437 on some or all of the materials 475 over a period of time. In other words, rather than the materials 475 being exposed to the fluid 437 on a relatively brief basis in the testing vessel 472 in the reaction module 470, the some or all of the materials 475 may be exposed to some or all of the post-reaction fluid 457 over a relatively longer period of time (e.g., a few months).

In certain example embodiments, the post-reaction fluid collection system 450 (or the reaction module 470 if the post-reaction fluid 457 is not transferred to the post-reaction fluid collection system 450) can, by collecting and analyzing the contents of the post-reaction fluid 457, determine the reaction of the fluid 437 with scales, fines, solids, rock, proppant, formation water, synthetic brines that are representative of formation water, and/or other parts of the materials 475. Particle size analysis and/or other types of analysis of scale depositions 213 in the post-reaction fluid 457 may be included. With this information, the post-reaction fluid collection system 450 (or the reaction module 470 if the post-reaction fluid 457 is not transferred to the post-reaction fluid collection system 450) may characterize the fluid chemistry and the solid phase of the post-reaction fluid 457. Characterization methods may include, but are not limited to, SEM/EDS, XRD, QXRD, and spectroscopy. The post-reaction fluid collection system 450 (or the reaction module 470 if the post-reaction fluid 457 is not transferred to the post-reaction fluid collection system 450) may also conduct one or more compatibility tests on the post-reaction fluid 457. Such compatibility tests may include, but are not limited to, fluid-rock-chemical compatibility tests and comparability tests of the post-reaction fluid 457 with scale inhibitors 447, water, oil, fluids, and/or chemicals placed and/or lost into the volume 190 of the subterranean formation 110.

For example, for treatment of the volume 190 using a fluid 437 during fracturing at a completion stage of a field operation, compatibility tests may include, but are not limited to, a mixture of the post-reaction fluid 457 and crude oil (or other subterranean resource 111) with rock, a mixture of the post-reaction fluid 457 and crude oil (or other subterranean resource 111) without rock, a mixture of the post-reaction fluid 457 and displacement fluid with rock, a mixture of the post-reaction fluid 457 and displacement fluid without rock, a mixture of the post-reaction fluid 457 and the fracturing fluid with rock, a mixture of the post-reaction fluid 457 and the fracturing fluid without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As another example, for treatment of the volume 190 using a fluid 437 for production enhancement during the production stage of a field operation, compatibility tests may include, but are not limited to, a mixture of the post-reaction fluid 457 and crude oil (or other subterranean resource 111) with rock, a mixture of the post-reaction fluid 457 and crude oil (or other subterranean resource 111) without rock, a mixture of the post-reaction fluid 457 and the formation water with rock, a mixture of the post-reaction fluid 457 and the formation water without rock, a mixture of the post-reaction fluid 457 and the completion brine with rock, and a mixture of the post-reaction fluid 457 and the completion brine without rock.

As yet another example, for treatment of the volume 190 using a fluid 437 for saltwater disposal (SWD) well injectivity enhancement of a field operation, compatibility tests may include, but are not limited to, a mixture of the post-reaction fluid 457 and the injection water with rock, a mixture of the post-reaction fluid 457 and the injection water without rock, a mixture of the post-reaction fluid 457 and the formation water with rock, and a mixture of the post-reaction fluid 457 and the formation water without rock. As still another example, a fracturing job may use a fracture fluid that includes a scale inhibitor 447 for eliminating or reducing scale depositions 213 in the near wellbore formation.

Based on the compatibility tests and other analysis of the post-reaction fluid 457, the post-reaction fluid collection system 450 (or the reaction module 470 if the post-reaction fluid 457 is not transferred to the post-reaction fluid collection system 450) may conduct one or more integrated tests on the post-reaction fluid 457 (or components thereof, such as the one or more added chemistry components). Such integrated tests may result in determining what may react, be dissolved, and/or be mobilized and in determining reaction kinetics. This information may help to assess the impact (e.g., scale modeling results for fluid comingling scenarios) of the post-reaction fluid 457 (or components thereof) on scale, asphaltene, and/or other types of accumulations on the volume 190 in the subterranean formation 110 during well intervention, shutting in, and/or post-treatment production.

Based on the results integration and analysis, the post-reaction fluid collection system 450 (or the reaction module 470 if the post-reaction fluid 457 is not transferred to the post-reaction fluid collection system 450) may help determine an optimized type and concentration of scale inhibitor 447 in a fluid 437 or stages of fluids 437 to be used downhole. For example, the post-reaction fluid collection system 450 (or the reaction module 470 if the post-reaction fluid 457 is not transferred to the post-reaction fluid collection system 450) may set and/or adjust the design and/or field treatment protocols of the volume 190 using a fluid 437 having a particular type and concentration of scale inhibitor 447 to optimize the efficiency of the well production performance. The post-reaction fluid collection system 450 (or the reaction module 470 if the post-reaction fluid 457 is not transferred to the post-reaction fluid collection system 450) may additionally consider the results from standard industry tests (e.g., re-gained permeability from core-flood tests) and other factors in determining well optimization. Well optimization may apply to one or more stages of a field operation, including but not limited to fluid (e.g., acid) treatment of fractures 101 at the completion stage of fracturing, fluid treatment as a special job for scales or fines removal, treatment using a fluid 437 having a scale inhibitor 447 for production enhancement during the production stage, a shut-in stage, and for SWD well injectivity enhancement.

One or more sensor devices 460 may be integrated with the reaction module 470 and/or the post-reaction fluid collection system 450. For example, two sensor devices 460 in the form of or including pressure sensors may be positioned before the testing vessel 472 and after the testing vessel 472 to provide a differential pressure value across the testing vessel 472. The differential pressure value may provide information as to, for example, a change in permeability, an accumulation of scale depositions 213, and/or plugging in the material 475. In some cases, in order to ensure that the post-reaction fluid collection system 450 receives the post-reaction fluid 457 from the reaction module 470 at an appropriate pressure, a pressure regulator (or other similar equipment) may be installed between the testing vessel 472 and the post-reaction fluid collection system 450.

The testing system 400 may include one or more controllers 404. A controller 404 of the testing system 400 communicates with and in some cases controls one or more of the other components (e.g., a sensor device 460, a scale inhibitor injection system 449, an additional fluid component injection system 438, the reaction module 470, the post-reaction fluid collection system 450) of the testing system 400. A controller 404 performs a number of functions that include obtaining and sending data, evaluating data, following protocols, running algorithms, and sending commands. A controller 404 may include one or more of a number of components. As discussed below with respect to FIG. 5, such components of a controller 404 may include, but are not limited to, a control engine, a communication module, a timer, a counter, a power module, a storage repository, a hardware processor, memory, a transceiver, an application interface, and a security module. When there are multiple controllers 404 (e.g., one controller 404 for one or more additional fluid component injection systems 438, another controller 404 for the reaction module 470, yet another controller 404 for the post-reaction fluid collection system 450, still another for one or more scale inhibitor injection systems 449), each controller 404 may operate independently of each other. Alternatively, one or more of the controllers 404 may work cooperatively with each other. As yet another alternative, one of the controllers 404 may control some or all of one or more other controllers 404 in the testing system 400. Each controller 404 may be considered a type of computer device, as discussed below with respect to FIG. 6.

Each sensor device 460 includes one or more sensors that measure one or more parameters (e.g., pressure, flow rate, temperature, humidity, fluid content, voltage, current, permeability, porosity, rock characteristics, chemical elements in a fluid, chemical elements in a solid). Examples of a sensor of a sensor device 460 may include, but are not limited to, a temperature sensor, a flow sensor, a pressure sensor, a gas spectrometer, a voltmeter, an ammeter, a permeability meter, a porosimeter, and a camera. A sensor device 460 may be integrated with or measure a parameter associated with one or more components of the testing system 400. For example, a sensor device 460 may be configured to measure a parameter (e.g., flow rate, pressure, temperature) of a scale inhibitor 447, an additional fluid component 427, a fluid 437, and/or a post-reaction fluid 457 flowing through the piping 488 at a particular location (e.g., between a scale inhibitor source 448 and a corresponding scale inhibitor injection system 449, between an additional fluid component source 428 and a corresponding additional fluid component injection system 438, between the header 489 and the reaction module 470, between the reaction module 470 and the post-reaction fluid collection system 450).

As another example, a sensor device 460 may be configured to determine how open or closed a valve 485 within the testing system 400 is. As yet another example, one or more sensor devices 460 may be used to identify an amount of scale depositions 213 that has accumulated on within formation water and/or rock in a testing vessel 472. As still another example, one or more sensor devices 460 may be used to identify an amount of scale deposition 213 and/or one or more chemistry components in the post-reaction fluid 457 that are not present in the fluid 437 before flowing through the materials 475. In some cases, a number of sensor devices 460, each measuring a different parameter, may be used in combination to determine and confirm whether a controller 404 should take a particular action (e.g., operate a valve 485, operate or adjust the operation of the post-reaction fluid collection system 450). When a sensor device 460 includes its own controller 404 (or portions thereof), then the sensor device 460 may be considered a type of computer device, as discussed below with respect to FIG. 6.

A user 451 may be any person that interacts, directly or indirectly, with a controller 404 and/or any other component of the testing system 400. Examples of a user 451 may include, but are not limited to, a business owner, an engineer, a company representative, a geologist, a consultant, a drilling engineer, a contractor, and a manufacturer's representative. A user 451 may use one or more user systems 455, which may include a display (e.g., a GUI). A user system 455 of a user 451 may interact with (e.g., send data to, obtain data from) the controller 404 via an application interface and using the communication links 405. The user 451 may also interact directly with the controller 404 through a user interface (e.g., keyboard, mouse, touchscreen).

The network manager 480 is a device or component that controls all or a portion (e.g., a communication network, the controller 404) of the testing system 400. The network manager 480 may be substantially similar to the controller 404, as described above. For example, the network manager 480 may include a controller that has one or more components and/or similar functionality to some or all of the controller 404. Alternatively, the network manager 480 may include one or more of a number of features in addition to, or altered from, the features of the controller 404. As described herein, control and/or communication with the network manager 480 may include communicating with one or more other components of the same testing system 400 or another system. In such a case, the network manager 480 may facilitate such control and/or communication. The network manager 480 may be called by other names, including but not limited to a master controller, a network controller, and an enterprise manager. The network manager 480 may be considered a type of computer device, as discussed below with respect to FIG. 6.

Interaction between each controller 404, the sensor devices 460, the users 451 (including any associated user systems 455), the network manager 480, and other components (e.g., the valves 485, a scale inhibitor injection system 449, an additional fluid component injection system 438, the reaction module 470, and the post-reaction fluid collection system 450) of the testing system 400 may be conducted using communication links 405 and/or power transfer links 487. Each communication link 405 may include wired (e.g., Class 1 electrical cables, Class 2 electrical cables, electrical connectors, Power Line Carrier, RS485) and/or wireless (e.g., Wi-Fi, Zigbee, visible light communication, cellular networking, Bluetooth, Bluetooth Low Energy (BLE), ultra-wide band (UWB), WirelessHART, ISA100) technology. A communication link 405 may transmit signals (e.g., communication signals, control signals, data) between each controller 404, the sensor devices 460, the users 451 (including any associated user systems 455), the network manager 480, and the other components of the testing system 400.

Each power transfer link 487 may include one or more electrical conductors, which may be individual or part of one or more electrical cables. In some cases, as with inductive power, power may be transferred wirelessly using power transfer links 487. A power transfer link 487 may transmit power between each controller 404, the sensor devices 460, the users 451 (including any associated user systems 455), the network manager 480, and the other components of the testing system 400. Each power transfer link 487 may be sized (e.g., 12 gauge, 18 gauge, 4 gauge) in a manner suitable for the amount (e.g., 480V, 24V, 120V) and type (e.g., alternating current, direct current) of power transferred therethrough.

Figure 5:
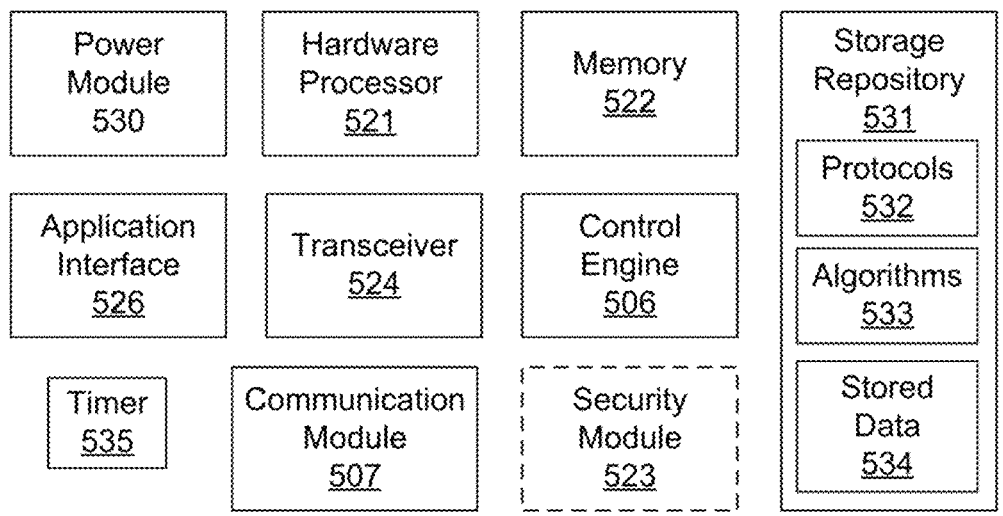
FIG. 5 shows a system diagram of a controller according to certain example embodiments.

FIG. 5 shows a system diagram of a controller 404 according to certain example embodiments. Referring to FIGS. 1A through 5, the controller 404 may be substantially the same as a controller 404 discussed above with respect to FIG. 4. The controller 404 includes multiple components. In this case, the controller 404 of FIG. 5 includes a control engine 506, a communication module 507, a timer 535, a power module 530, a storage repository 531, a hardware processor 521, a memory 522, a transceiver 524, an application interface 526, and, optionally, a security module 523. The controller 404 (or components thereof) may be located at or near the various components of the testing system 400. In addition, or in the alternative, the controller 404 (or components thereof) may be located remotely from (e.g., in the cloud, at an office building) the various components of the testing system 400.

The storage repository 531 may be a persistent storage device (or set of devices) that stores software and data used to assist the controller 404 in communicating with one or more other components of a system, such as the users 451 (including associated user systems 455), each scale inhibitor injection system 449, each additional fluid component injection system 438, the reaction module 470, each post-reaction fluid collection system 450, the network manager 480, and the sensor devices 460 of the testing system 400 of FIG. 4 above. In one or more example embodiments, the storage repository 531 stores one or more protocols 532, algorithms 533, and stored data 534.

The protocols 532 of the storage repository 531 may be any procedures (e.g., a series of method steps) and/or other similar operational processes that the control engine 506 of the controller 404 follows based on certain conditions at a point in time. The protocols 532 may include any of a number of communication protocols that are used to send and/or obtain data between the controller 404 and other components of a system (e.g., the testing system 400). Such protocols 532 used for communication may be time-synchronized protocols. Examples of such time-synchronized protocols may include, but are not limited to, a highway addressable remote transducer (HART) protocol, a wirelessHART protocol, and an International Society of Automation (ISA) 100 protocol. In this way, one or more of the protocols 532 may provide a layer of security to the data transferred within a system (e.g., the testing system 400). Other protocols 532 used for communication may be associated with the use of Wi-Fi, Zigbee, visible light communication (VLC), cellular networking, BLE, UWB, and Bluetooth.

The algorithms 533 may be any formulas, mathematical models, forecasts, simulations, and/or other similar tools that the control engine 506 of the controller 404 uses to reach a computational conclusion. For example, one or more algorithms 533 may be used, in conjunction with one or more protocols 532, to assist the controller 404 to determine when to start, adjust, and/or stop the operation of the reaction module 470 and/or the post-reaction fluid collection system 450. As another example, one or more algorithms 533 may be used, in conjunction with one or more protocols 532, to assist the controller 404 to determine when to start, adjust, and/or stop the operation of a scale inhibitor injection system 449 and/or an additional fluid component injection system 438.

As yet another example, one or more algorithms 533 may be used, in conjunction with one or more protocols 532, to assist the controller 404 to identify an optimal formulation of a fluid 437 (and particularly a scale inhibitor 447 thereof) to reduce or eliminate scale depositions 213 on the materials 475 within a testing vessel 472 and/or in the post-reaction fluid 457. As still another example, one or more algorithms 533 may be used, in conjunction with one or more protocols 532, to assist the controller 404 in identifying one or more chemistry components in the post-reaction fluid 457 that are not present in the fluid 437 before flowing through the materials 475 and evaluating the effect of those one or more chemistry components on some or all of the materials 475 over time.

Stored data 534 may be any data associated with a field (e.g., the subterranean formation 110, the induced fractures 101 within the volume 190 adjacent to a wellbore 120, the characteristics of proppant 112 used in a field operation, different types and concentrations of scale inhibitors 447), other fields (e.g., other wellbores and subterranean formations), the other components (e.g., the user systems 455, the reaction module 470, the materials 475 in the testing vessel 472, the post-reaction fluid collection system 450), including associated equipment (e.g., motors, pumps, compressors), of the testing system 400, measurements made by the sensor devices 460, threshold values, tables, results of previously run or calculated algorithms 533, updates to protocols 532, user preferences, and/or any other suitable data. Such data may be any type of data, including but not limited to historical data, present data, and future data (e.g., forecasts). The stored data 534 may be associated with some measurement of time derived, for example, from the timer 535.

Examples of a storage repository 531 may include, but are not limited to, a database (or a number of databases), a file system, cloud-based storage, a hard drive, flash memory, some other form of solid-state data storage, or any suitable combination thereof. The storage repository 531 may be located on multiple physical machines, each storing all or a portion of the communication protocols 532, the algorithms 533, and/or the stored data 534 according to some example embodiments. Each storage unit or device may be physically located in the same or in a different geographic location.

The storage repository 531 may be operatively connected to the control engine 506. In one or more example embodiments, the control engine 506 includes functionality to communicate with the users 451 (including associated user systems 455), the sensor devices 460, the network manager 480, and the other components in the testing system 400. More specifically, the control engine 506 sends information to and/or obtains information from the storage repository 531 in order to communicate with the users 451 (including associated user systems 455), the sensor devices 460, the network manager 480, and the other components of the testing system 400. As discussed below, the storage repository 531 may also be operatively connected to the communication module 507 in certain example embodiments.

In certain example embodiments, the control engine 506 of the controller 404 controls the operation of one or more components (e.g., the communication module 507, the timer 535, the transceiver 524) of the controller 404. For example, the control engine 506 may activate the communication module 507 when the communication module 507 is in "sleep" mode and when the communication module 507 is needed to send data obtained from another component (e.g., a sensor device 460) in the testing system 400. In addition, the control engine 506 of the controller 404 may control the operation of one or more other components (e.g., the reaction module 470, the post-reaction fluid collection system 450, a scale inhibitor injection system 449, an additional fluid component injection system 438), or portions thereof, of the testing system 400.

The control engine 506 of the controller 404 may communicate with one or more other components of the testing system 400. For example, the control engine 506 may use one or more protocols 532 to facilitate communication with the sensor devices 460 to obtain data (e.g., measurements of various parameters, such as temperature, pressure, and flow rate), whether in real time or on a periodic basis and/or to instruct a sensor device 460 to take a measurement. The control engine 506 may use measurements of parameters taken by sensor devices 460 while a post-reaction fluid 457 flows from the reaction module 470 to the post-reaction fluid collection system 450, as well as one or more protocols 532 and/or algorithms 533, to analyze the contents of the post-reaction fluid 457. As yet another example, the control engine 506 may use one or more algorithms 533 and/or protocols 532 to recommend a change to the formulation (e.g., adding an additional fluid component 427, removing an additional fluid component 427, swapping one scale inhibitor 447 for another scale inhibitor 447, increasing an amount (concentration) of a scale inhibitor 447, decreasing an amount of a scale inhibitor 447) of a fluid 437, based on the analysis of a prior post-reaction fluid 457, in an attempt to optimize a scale inhibitor 447, thereby enhancing operational capability in a particular stage of a field operation.

The control engine 506 may generate and process data associated with control, communication, and/or other signals sent to and obtained from the users 451 (including associated user systems 455), the sensor devices 460, the network manager 480, and the other components of the testing system 400. In certain embodiments, the control engine 506 of the controller 404 may communicate with one or more components of a system external to the testing system 400. For example, the control engine 506 may interact with an inventory management system by ordering replacements for components or pieces of equipment (e.g., a sensor device 460, a valve 485, a motor) within the testing system 400 that has failed or is failing. As another example, the control engine 506 may interact with a contractor or workforce scheduling system by arranging for the labor needed to replace a component or piece of equipment in the testing system 400. In this way and in other ways, the controller 404 is capable of performing a number of functions beyond what could reasonably be considered a routine task.

In certain example embodiments, the control engine 506 may include an interface that enables the control engine 506 to communicate with the sensor devices 460, the user systems 455, the network manager 480, and/or other components of the testing system 400. For example, if a user system 455 operates under IEC Standard 62386, then the user system 455 may have a serial communication interface that will transfer data to the controller 404. Such an interface may operate in conjunction with, or independently of, the protocols 532 used to communicate between the controller 404 and the users 451 (including corresponding user systems 455), the sensor devices 460, the network manager 480, and the other components of the testing system 400.

The control engine 506 (or other components of the controller 404) may also include one or more hardware components and/or software elements to perform its functions. Such components may include, but are not limited to, a universal asynchronous receiver/transmitter (UART), a serial peripheral interface (SPI), a direct-attached capacity (DAC) storage device, an analog-to-digital converter, an inter-integrated circuit (I2C), and a pulse width modulator (PWM).

The communication module 507 of the controller 404 determines and implements the communication protocol (e.g., from the protocols 532 of the storage repository 531) that is used when the control engine 506 communicates with (e.g., sends signals to, obtains signals from) the user systems 455, the sensor devices 460, the network manager 480, and the other components of the testing system 400. In some cases, the communication module 507 accesses the stored data 534 to determine which communication protocol is used to communicate with another component of the testing system 400. In addition, the communication module 507 may identify and/or interpret the communication protocol of a communication obtained by the controller 404 so that the control engine 506 may interpret the communication. The communication module 507 may also provide one or more of a number of other services with respect to data sent from and obtained by the controller 404. Such services may include, but are not limited to, data packet routing information and procedures to follow in the event of data interruption.

The timer 535 of the controller 404 may track clock time, intervals of time, an amount of time, and/or any other measure of time. The timer 535 may also count the number of occurrences of an event, whether with or without respect to time. Alternatively, the control engine 506 may perform a counting function. The timer 535 is able to track multiple time measurements and/or count multiple occurrences concurrently. The timer 535 may track time periods based on an instruction obtained from the control engine 506, based on an instruction obtained from a user 451, based on an instruction programmed in the software for the controller 404, based on some other condition (e.g., the occurrence of an event) or from some other component, or from any combination thereof. In certain example embodiments, the timer 535 may provide a time stamp for each packet of data obtained from another component (e.g., a sensor device 460) of the testing system 400.

The power module 530 of the controller 404 obtains power from a power supply (e.g., AC mains) and manipulates (e.g., transforms, rectifies, inverts) that power to provide the manipulated power to one or more other components (e.g., the timer 535, the control engine 506) of the controller 404, where the manipulated power is of a type (e.g., alternating current, direct current) and level (e.g., 12V, 24V, 120V) that may be used by the other components of the controller 404. In some cases, the power module 530 may also provide power to one or more of the sensor devices 460.

The power module 530 may include one or more of a number of single or multiple discrete components (e.g., transistor, diode, resistor, transformer) and/or a microprocessor. The power module 530 may include a printed circuit board, upon which the microprocessor and/or one or more discrete components are positioned. In addition, or in the alternative, the power module 530 may be a source of power in itself to provide signals to the other components of the controller 404. For example, the power module 530 may be or include an energy storage device (e.g., a battery). As another example, the power module 530 may be or include a localized photovoltaic power system.

The hardware processor 521 of the controller 404 executes software, algorithms (e.g., algorithms 533), and firmware in accordance with one or more example embodiments. Specifically, the hardware processor 521 may execute software on the control engine 506 or any other portion of the controller 404, as well as software used by the users 451 (including associated user systems 455), the network manager 480, and/or other components of the testing system 400. The hardware processor 521 may be an integrated circuit, a central processing unit, a multi-core processing chip, SoC, a multi-chip module including multiple multi-core processing chips, or other hardware processor in one or more example embodiments. The hardware processor 521 may be known by other names, including but not limited to a computer processor, a microprocessor, and a multi-core processor.

In one or more example embodiments, the hardware processor 521 executes software instructions stored in memory 522. The memory 522 includes one or more cache memories, main memory, and/or any other suitable type of memory. The memory 522 may include volatile and/or non-volatile memory. The memory 522 may be discretely located within the controller 404 relative to the hardware processor 521. In certain configurations, the memory 522 may be integrated with the hardware processor 521.

In certain example embodiments, the controller 404 does not include a hardware processor 521. In such a case, the controller 404 may include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 404 (or portions thereof) to be programmable and function according to certain logic rules and thresholds without the use of a hardware processor. Alternatively, FPGAs, IGBTs, ICs, and/or similar devices may be used in conjunction with one or more hardware processors 521.

The transceiver 524 of the controller 404 may send and/or obtain control and/or communication signals. Specifically, the transceiver 524 may be used to transfer data between the controller 404 and the users 451 (including associated user systems 455), the sensor devices 460, the network manager 480, and the other components of the testing system 400. The transceiver 524 may use wired and/or wireless technology. The transceiver 524 may be configured in such a way that the control and/or communication signals sent and/or obtained by the transceiver 524 may be obtained and/or sent by another transceiver that is part of a user system 455, a sensor device 460, the network manager 480, and/or another component of the testing system 400. The transceiver 524 may send and/or obtain any of a number of signal types, including but not limited to radio frequency signals.

When the transceiver 524 uses wireless technology, any type of wireless technology may be used by the transceiver 524 in sending and obtaining signals. Such wireless technology may include, but is not limited to, Wi-Fi, Zigbee, VLC, cellular networking, BLE, UWB, and Bluetooth. The transceiver 524 may use one or more of any number of suitable communication protocols (e.g., ISA100, HART) when sending and/or obtaining signals.

Optionally, in one or more example embodiments, the security module 523 secures interactions between the controller 404, the users 451 (including associated user systems 455), the sensor devices 460, the network manager 480, and the other components of the testing system 400. More specifically, the security module 523 authenticates communication from software based on security keys verifying the identity of the source of the communication. For example, user software may be associated with a security key enabling the software of a user system 455 to interact with the controller 404. Further, the security module 523 may restrict receipt of information, requests for information, and/or access to information.

A user 451 (which may include an associated user system 455), the sensor devices 460, the network manager 480, and the other components of the testing system 400 may interact with the controller 404 using the application interface 526. Specifically, the application interface 526 of the controller 404 obtains data (e.g., information, communications, instructions, updates to firmware) from and sends data (e.g., information, communications, instructions) to the user systems 455 of the users 451, the sensor devices 460, the network manager 480, and/or the other components of the testing system 400. Examples of an application interface 526 may be or include, but are not limited to, an application programming interface, a web service, a data protocol adapter, some other hardware and/or software, or any suitable combination thereof. Similarly, the user systems 455 of the users 451, the sensor devices 460, the network manager 480, and/or the other components of the testing system 400 may include an interface (similar to the application interface 526 of the controller 404) to obtain data from and send data to the controller 404 in certain example embodiments.

In addition, as discussed above with respect to a user system 455 of a user 451, one or more of the sensor devices 460, the network manager 480, and/or one or more of the other components of the testing system 400 may include a user interface. Examples of such a user interface may include, but are not limited to, a graphical user interface, a touchscreen, a keyboard, a monitor, a mouse, some other hardware, or any suitable combination thereof.

The controller 404, the users 451 (including associated user systems 455), the sensor devices 460, the network manager 480, and the other components of the testing system 400 may use their own system or share a system in certain example embodiments. Such a system may be, or contain a form of, an Internet-based or an intranet-based computer system that is capable of communicating with various software. A computer system includes any type of computing device and/or communication device, including but not limited to the controller 404. Examples of such a system may include, but are not limited to, a desktop computer with a Local Area Network (LAN), a Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system may correspond to a computer system as described below with regard to FIG. 6.

Further, as discussed above, such a system may have corresponding software (e.g., user system software, sensor device software, controller software). The software may execute on the same or a separate device (e.g., a server, mainframe, desktop personal computer (PC), laptop, PDA, television, cable box, satellite box, kiosk, telephone, mobile phone, or other computing devices) and may be coupled by the communication network (e.g., Internet, Intranet, Extranet, LAN, WAN, or other network communication methods) and/or communication channels, with wire and/or wireless segments according to some example embodiments. The software of one system may be a part of, or operate separately but in conjunction with, the software of another system within the testing system 400.

Figure 6:
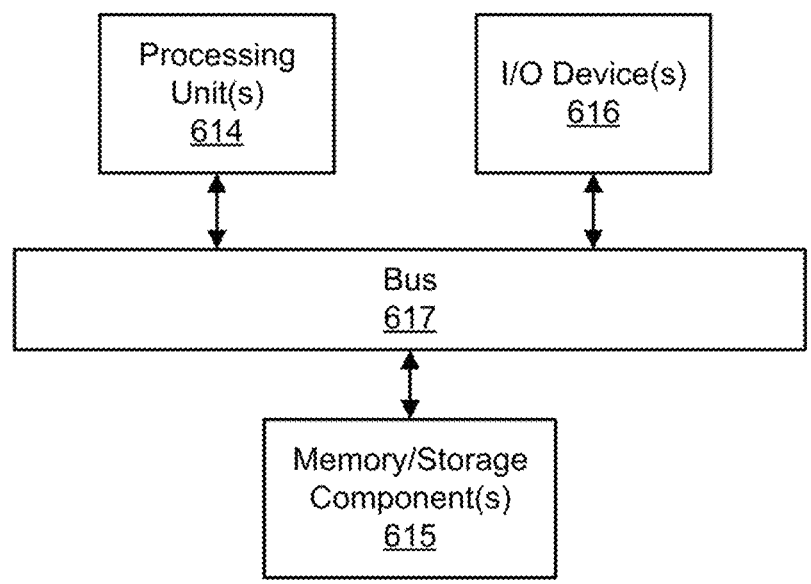
FIG. 6 shows a computing device in accordance with certain example embodiments.

FIG. 6 illustrates one embodiment of a computing device 618 that implements one or more of the various techniques described herein, and which is representative, in whole or in part, of the elements described herein pursuant to certain example embodiments. For example, a controller 404 (including components thereof, such as a control engine 506, a hardware processor 521, a storage repository 531, a power module 530, and a transceiver 524) may be considered a computing device 618 (also called a computer system 618 herein). Computing device 618 is one example of a computing device and is not intended to suggest any limitation as to scope of use or functionality of the computing device and/or its possible architectures. Neither should the computing device 618 be interpreted as having any dependency or requirement relating to any one or combination of components illustrated in the example computing device 618.

The computing device 618 includes one or more processors or processing units 614, one or more memory/storage components 615, one or more input/output (I/O) devices 616, and a bus 617 that allows the various components and devices to communicate with one another. The bus 617 represents one or more of any of several types of bus structures, including a memory bus or memory controller, a peripheral bus, an accelerated graphics port, and a processor or local bus using any of a variety of bus architectures. The bus 617 includes wired and/or wireless buses.

The memory/storage component 615 represents one or more computer storage media. The memory/storage component 615 includes volatile media (such as random access memory (RAM)) and/or nonvolatile media (such as read only memory (ROM), flash memory, optical disks, magnetic disks, and so forth). The memory/storage component 615 includes fixed media (e.g., RAM, ROM, a fixed hard drive, etc.) as well as removable media (e.g., a Flash memory drive, a removable hard drive, an optical disk, and so forth).

One or more I/O devices 616 allow a user 451 to enter commands and information to the computing device 618, and also allow information to be presented to the user 451 and/or other components or devices. Examples of input devices 616 include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 618 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 618 includes at least the minimal processing, input, and/or output means necessary to practice one or more embodiments.

Further, those skilled in the art will appreciate that one or more elements of the aforementioned computer device 618 is located at a remote location and connected to the other elements over a network in certain example embodiments. Further, one or more embodiments is implemented on a distributed system having one or more nodes, where each portion of the implementation (e.g., an injection system 438, the reaction module 470, the post-reaction fluid collection system 450) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 7:
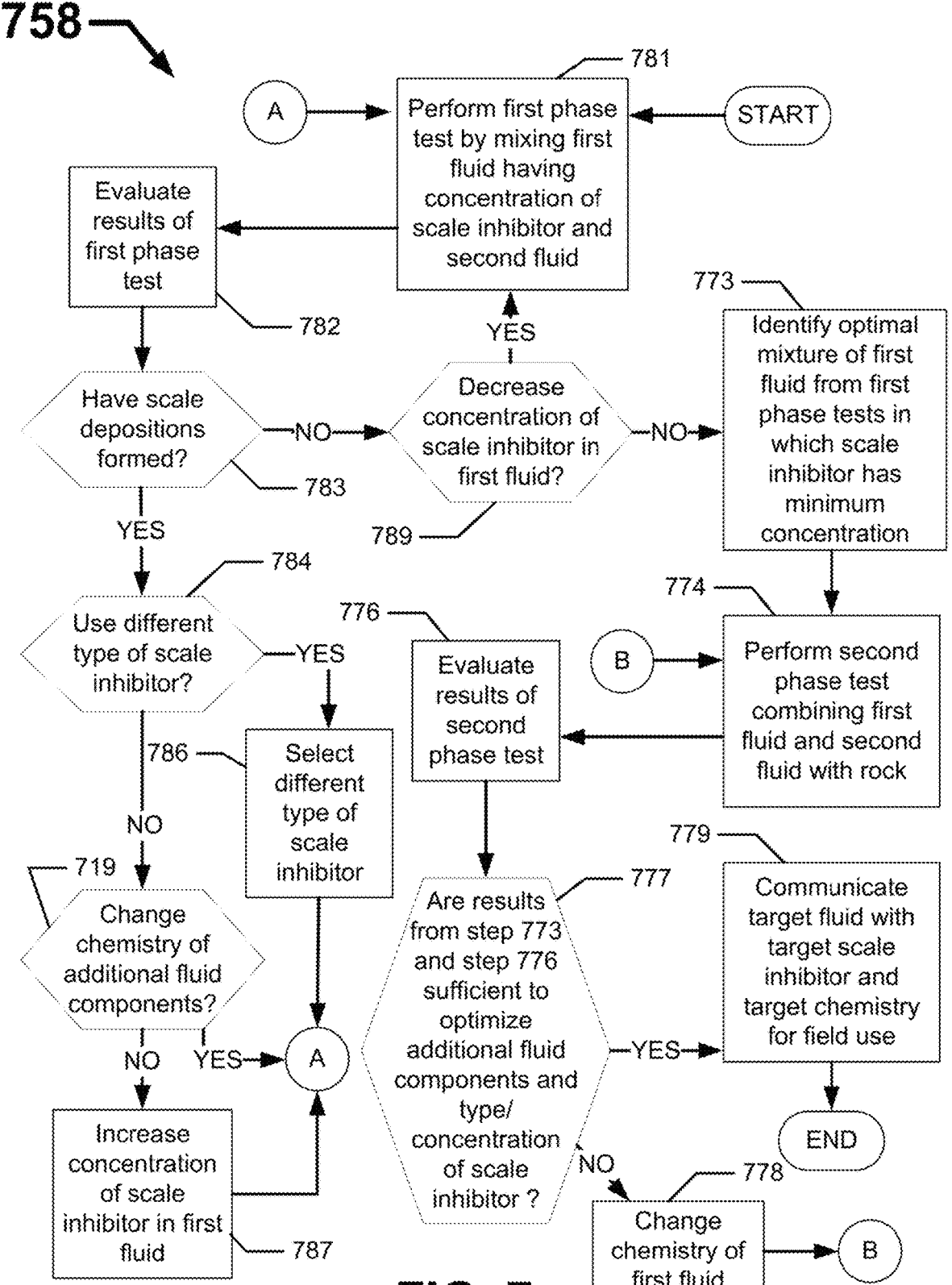
FIG. 7 shows a flowchart of a method for optimizing scale management at the subsurface for improved well performance according to certain example embodiments.

FIG. 7 shows a flowchart 758 of a method for optimizing a scale inhibitor 447 at the subsurface for improved well performance according to certain example embodiments. While the various steps in this flowchart 758 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order. In some cases, a number of first phase tests and/or second phase tests may be conducted simultaneously using different types and/or concentrations of scale inhibitors 447 and/or using different types and/or amounts of additional fluid components 427.

In addition, a person of ordinary skill in the art will appreciate that additional steps not shown in FIG. 7 may be included in performing this method. Accordingly, the specific arrangement of steps should not be construed as limiting the scope. Further, a particular computing device, such as the computing device 618 discussed above with respect to FIG. 6, may be used to perform or facilitate performance of one or more of the steps for the methods shown in FIG. 7 in certain example embodiments. Any of the functions performed below by a controller 404 (an example of which is shown in FIG. 5) may involve the use of one or more protocols 532, one or more algorithms 533, and/or stored data 534 stored in a storage repository 531. In addition, or in the alternative, any of the functions in the method may be performed by a user (e.g., user 451).

The method shown in FIG. 7 is merely an example that may be performed by using an example system described herein. In other words, systems for optimizing a scale inhibitor 447 at the subsurface for improved well performance may perform other functions using other methods in addition to and/or aside from those shown in FIG. 7. Referring to FIGS. 1A through 7, the method shown in the flowchart 758 of FIG. 7 begins at the START step and proceeds to step 781, where a first phase test is performed by mixing one fluid 437 that includes a scale inhibitor 447 with materials 475 (or the fluid 437 on its own if there are no materials 475 for a particular first phase test test) in fluid form, which may contain different water sources or their mixtures. The first phase test may be conducted using the testing system 400 (or portions thereof) of FIG. 4.

During a hydraulic fracturing stage of a subterranean field operation, the fracture fluid used mixes with the rock (e.g., rock found in the rock matrices 162, rock in the fracture face 102) and other waters (e.g., formation water, water from non-targeted formation, or other waters) at the subsurface, followed by the relatively lengthy shut-in stage, tends to generate scale depositions 213 that form on the fracture face 102 of the fractures 101, in the rock matrices 162, on the proppant 112, in equipment (e.g., pipes) used in the field operation, and/or on other surfaces involved in the field operation. As discussed above, when the well is put on production, these scale depositions 213 ultimately accumulate to the point of congesting or stopping paths through which the subterranean resource 111 may be extracted. In this way, the scale depositions 213 may reduce, in some cases dramatically reduce, the productivity of a well. The first phase test, without using rock, such as rock found in the rock matrices 162 and along the fracture face 102 of the fractures 101, is designed to establish a baseline of a particular amount of a particular type of scale inhibitor 447 used in a fluid 437 having particular amounts of various additional fluid components 427.

In certain example embodiments, the scale inhibitor 447 has a concentration within the fluid 437. For example, the scale inhibitor 447 may have a minimum concentration within the range of 50 ppm-250 ppm. The minimum amount of scale inhibitor 447 may be based on one or more of a number of factors, including but not limited to scale risk. In alternative embodiments, a fluid 437 does not have any scale inhibitor 447. The additional fluid components 427 of the fluid 437 may be part of what is used in a stage of a field operation. For example, the additional fluid components 427 may include water, proppant, field additives, and/or chemical additives that combine to form a fracturing fluid used during a hydraulic fracturing stage of a subterranean field operation. The materials 475 in this case are in fluid form that are disposed in the testing vessel 472 of the reaction module 470. The materials 475 in fluid form may have any of a number of components that result in the materials 475. For example, when the fluid 437 is a fracturing fluid with scale inhibitor 447, the materials 475 in fluid form may be or include formation water (e.g., formation water 161) that is expected to be found in the volume 190 of the subterranean formation 110. Alternatively, the materials 475 in fluid form may be or include one or more synthetic brines that are representative of formation water.

In some cases, the amount of time that the fluid 437 mixes with the materials 475 in fluid form in the reaction module 470 may be extended (e.g., one month, two months, three months) to simulate a different stage (e.g., a shut-in stage, which occurs after a fracturing stage) of a field operation. Further, during this subsequent stage in a field operation at the subsurface, the contents of the in situ water in the near-wellbore formation may change. In such cases, when the materials 475 in fluid form are designed to replicate the fluid phase at the subsurface, the contents of the materials 475 in fluid form in the testing vessel 472 of the reaction module 470 may be changed during the extended testing period to simulate subsurface conditions as much as possible.

In addition to the duration of the first phase test and trying to replicate the changes to the water at the subsurface by adjusting the contents of the materials 475 in fluid form at one or more different points along the duration of the first phase test, other aspects of the first phase test may additionally or alternatively be controlled. For example, the reaction module 470 may be controlled in terms of the pressure and/or temperature that is asserted on the contents (in this case, the mixture of the fluid 437 with the materials 475 in fluid form) of the testing vessel 472. In addition, or in the alternative, the flow rate of the fluid 437 flowing through the materials 475 in fluid form in the testing vessel 472 may be controlled. In such cases, the values of the temperature, the pressure, and/or the flow rate may differ at different points of the duration of the first phase test, in some cases in an attempt to simulate the hydraulic fracking and shut-in stages of a subterranean field operation.

Control of some or all of the first phase test may be performed by a controller 404 (or a testing component thereof) using one or more protocols 532, one or more algorithms 533 (e.g., models), measurements of one or more sensor devices 460, input from a user 451 (which may include an associated user system 455), and/or any other source of information within the testing system 400. In some cases, input for one or more aspects (e.g., an actual concentration of the scale inhibitor 447 in the fluid 437) of the first phase test may be provided (e.g., by a user system 455, by a sensor device 460) to the controller 404. In addition, or in the alternative, control of some or all of the first phase test may be performed by a user 451 (which may include an associated user system 455), the network manager 480, and/or some other component of the testing system 400. The duration of the first phase test (or portions thereof, such as the simulated duration of the hydraulic fracturing stage of a subterranean field operation) may be timed by the timer 535 of the controller 404.

In certain example embodiments, multiple first phase tests are performed simultaneously (in parallel with each other). In such cases, each of the multiple first phase tests may be distinguished from the other simultaneous first phase tests by varying one or more of a number of factors, including but not limited to the duration of the test, the concentration of the scale inhibitor 447, the type of scale inhibitor 447, the content of the additional fluid components 437, and the proportions (amounts or concentrations) of each of the additional fluid components 437.

When the first phase test is complete, the process proceeds to step 782, where the results of the first phase test are evaluated. The results (e.g., the amount of scale deposition 213 in the materials 475 in fluid form and/or on the testing vessel 472) of the first phase test may be determined by a controller 404 (or an evaluating component thereof) using one or more protocols 532, one or more algorithms 533, information obtained from a user 451 (which may include an associated user system 455), measurements obtained from one or more sensor devices 460, and/or information obtained from any source in the system 400. In addition, or in the alternative, one or more users 451 may perform the various functions (e.g., measuring, mixing, observing, evaluating) required to conduct one or more first phase tests. As used herein, the term "obtaining" may include receiving, retrieving, accessing, generating, etc. or any other manner of obtaining the information. Other aspects (e.g., the contents and amount of each component of the post-reaction fluid 457) of the fluid 437, the materials 475 in fluid form, and/or other components or byproducts of the first phase test may also be measured and evaluated. For example, the post-reaction fluid 457 may flow to the post-reaction fluid collection system 450 to be tested and evaluated.

In step 783, a determination is made as to whether scale depositions 213 have formed. For example, if the amount and/or type of the scale inhibitor 447 in the fluid 437 is insufficient, when the fluid 437 and the materials 475 in fluid form mix, to reduce/prevent the development of scale depositions 213, then scale depositions 213 may develop at the end of the first phase test result in and/or on the inner surfaces of the testing vessel 472. The development of scale depositions 213 may be determined by a controller 404 (or a determining component thereof) using one or more protocols 532, one or more algorithms 533, measurements of one or more sensor devices 460, input from a user 451 (which may include an associated user system 455), and/or any other source of information within the testing system 400. Alternatively, a user 451 may determine (e.g., by a visualization test) whether scale depositions 213 have formed. If scale depositions 213 have formed, then the process proceeds to step 784. If scale depositions 213 have not formed, then the process proceeds to step 789.

In step 784, a determination is made as to whether a different type of scale inhibitor 447 should be used. In some cases, after one or more of the first phase tests are performed using one type of scale inhibitor 447, the effectiveness of that scale inhibitor 447 in light of the additional fluid components 427 of the fluid 437 and/or the components of the materials 475 in fluid form may be deemed ineffective relative to other types of scale inhibitors 447 that are available. Whether a different type of scale inhibitor 447 should be used may be determined by a controller 404 (or a determining component thereof) using one or more protocols 532, one or more algorithms 533 (e.g., models), measurements of one or more sensor devices 460, input from a user 451 (which may include an associated user system 455), and/or any other source of information within the testing system 400. Alternatively, a user 451 may determine whether a different type of scale inhibitor should be used. If a different type of scale inhibitor 447 should be used, then the process proceeds to step 786. If a different type of scale inhibitor 447 should not be used, then the process proceeds to step 719.

In step 719, a determination is made as to whether the chemistry of the additional fluid components 427 should be changed. The chemistry of additional fluid components 427 may be in terms of, for example, content (e.g., the particular fluid components 427) and/or concentration of each fluid component 427. As stated above, the fluid 437 tested in a first phase test is made up of a scale inhibitor 447 and one or more additional fluid components 427. When example embodiments are used to determine an optimal fracture fluid to use in a field operation, the scale inhibitor 447 is only one component of the fracture fluid 437. As such, example embodiments are designed to determine both the optimal chemistry of the additional fluid components 427 (e.g., fracture water) and the optimal type/concentration of the scale inhibitor 447 added to the additional fluid components 427 to arrive at the fluid 437 (e.g., the fracture fluid).

Whether the chemistry of the additional fluid components 427 should be changed may be determined by a controller 404 (or a determining component thereof) using one or more protocols 532, one or more algorithms 533 (e.g., models), measurements of one or more sensor devices 460, input from a user 451 (which may include an associated user system 455), and/or any other source of information within the testing system 400. Alternatively, a user 451 may determine whether the chemistry of the additional fluid components 427 should be changed. If the chemistry of the additional fluid components 427 should be changed, then the process reverts to step 781. If the chemistry of the additional fluid components 427 should not be changed, then the process proceeds to step 787.

In step 786, a different type of scale inhibitor 447 is selected. The different type of scale inhibitor 447 may be selected by a controller 404 (or a selecting component thereof) using one or more protocols 532, one or more algorithms 533 (e.g., models), measurements of one or more sensor devices 460, input from a user 451 (which may include an associated user system 455), and/or any other source of information within the testing system 400. A different type of scale inhibitor 447 may include any synthetic or naturally-occurring element or compound that may inhibit the development of scale depositions 213. If the selected scale inhibitor 447 is not available (e.g., not in inventory, not available in sufficient quantity for projected needs in subsequent first phase tests), the controller 404 may arrange for the procurement of the selected scale inhibitor 447 in the required amount. Alternatively, the controller 404 may notify another component (e.g., a user 451) of the need to acquire the selected scale inhibitor 447. When step 786 is complete, the process reverts to step 781 using the newly selected scale inhibitor 447.

In step 787, the concentration of the scale inhibitor 447 is increased in the fluid 437. The decision as to how much the amount of the scale inhibitor 447 should be increased may be made by a controller 404 (or a decision component thereof) using one or more protocols 532, one or more algorithms 533 (e.g., models), measurements of one or more sensor devices 460, input from a user 451 (which may include an associated user system 455), and/or any other source of information within the testing system 400.

In addition, or in the alternative, execution of the increase in the concentration of the scale inhibitor 447 in the fluid 437 may be performed by a controller 404 (or a performance component thereof) using one or more protocols 532, one or more algorithms 533 (e.g., models), measurements of one or more sensor devices 460, input from a user 451 (which may include an associated user system 455), and/or any other source of information within the testing system 400. To increase the concentration of the scale inhibitor 447 in the fluid 437, the controller 404 may increase the output of the scale inhibitor injection system 449 that corresponds to the scale inhibitor source 448 of the scale inhibitor 447. In addition, or in the alternative, the controller 404 may decrease the output of the additional fluid component injections systems 438 that correspond to the additional fluid component sources 428 of the additional fluid components 427 used in the fluid 437. When step 787 is complete, the process reverts to step 781 using the new amount of the previously-used scale inhibitor 447.

In step 789, a determination is made as to whether to decrease the concentration of the scale inhibitor 447 in the fluid 437. The decision as to how much the concentration of the scale inhibitor 447 should be decreased may be made by a controller 404 (or a decision component thereof) using one or more protocols 532, one or more algorithms 533 (e.g., models), measurements of one or more sensor devices 460, input from a user 451 (which may include an associated user system 455), and/or any other source of information within the testing system 400.

To decrease the concentration of the scale inhibitor 447 in the fluid 437, the controller 404 may decrease the output of the scale inhibitor injection system 449 that corresponds to the scale inhibitor source 448 of the scale inhibitor 447. In addition, or in the alternative, the controller 404 may increase the output of the additional fluid component injections systems 438 that correspond to the additional fluid component sources 428 of the additional fluid components 427 used in the fluid 437. In addition, or in the alternative, execution of the decrease in the amount of the scale inhibitor 447 in the fluid 437 may be performed by a controller 404 (or a performance component thereof) using one or more protocols 532, one or more algorithms 533 (e.g., models), measurements of one or more sensor devices 460, input from a user 451 (which may include an associated user system 455), and/or any other source of information within the testing system 400. If the amount of the scale inhibitor 447 in the fluid 437 is decreased, the process reverts to step 781. If the amount of the scale inhibitor 447 in the fluid 437 is not decreased, the process proceeds to step 773.

In certain example embodiments, step 789 may also include determining whether the chemistry of the additional fluid components 427 should be changed, similar to what is described in step 719 above. As stated above, the fluid 437 tested in a first phase test is made up of a scale inhibitor 447 and one or more additional fluid components 427. When example embodiments are used to determine an optimal fracture fluid to use in a field operation, the scale inhibitor 447 is only one component of the fracture fluid 437. As such, example embodiments are designed to determine both the optimal chemistry of the additional fluid components 427 (e.g., fracture water) and the optimal type/concentration of the scale inhibitor 447 added to the additional fluid components 427 to arrive at the fluid 437 (e.g., the fracture fluid). As such, changing the chemistry of the additional fluid components 427 may be made independent of, or in conjunction with, changing the concentration and/or type of scale inhibitor 447 in the fluid 437.

In a specific field case, water with a high level of Ba (collectively the materials 475 in the test environment) may be present at the subsurface, and fracture fluid may have $SO_4$ (collectively a fluid 437 in the test environment), which means that there is potential to form $BaSO_4$ scale depositions 213 when these two waters commingle. By decreasing the amount of $SO_4$ in the fracture fluid to a certain maximum threshold level or lower, the minimum scale inhibitor concentration may be 0. Realistically, though, it will be difficult for field operations to have such fracture fluid, and so alternative fracture fluid compositions (e.g., A, B, C) need to be considered in the test environment. When this occurs, a determination may be made as to the minimum concentration of scale inhibitor 447 in each of fluids 437 (e.g., having fracture fluid compositions A, B, C) when those fluids (with the scale inhibitor 447) are commingled with high $SO_4$ fracture fluid (the materials 475).

In step 773, the optimal mixture of the fluid 437 from the first phase tests in which the scale inhibitor 447 has a minimum concentration is identified. The identification of the optimal mixture of the fluid 437 from the first phase tests may be performed by a controller 404 (or an identifying component thereof) using one or more protocols 532, one or more algorithms 533 (e.g., models), measurements of one or more sensor devices 460, input from a user 451 (which may include an associated user system 455), and/or any other source of information within the testing system 400. The minimum concentration of the scale inhibitor 447 in the optimal mixture of the fluid 437 from the first phase tests may also be called the minimum scale inhibitor concentration without rock (MSICWOR). The MSICWOR is assumed at that time in the process to be the best concentration of that particular scale inhibitor 447 in the particular fluid 437 (e.g., fracture fluid), mixed with the materials 475 in fluid form over a period of time, that inhibits scale depositions 213 without causing other potential issues (e.g., corrosion) if used in subsurface conditions.

In step 774, a second phase test combining the fluid 437 from the first phase test and the materials 475 in fluid form used in the first phase tests (where the rock and the second fluid are collectively the materials 475 in this step 774) with rock (e.g., rock from the rock matrices 162, rock in the fracture face 102) is performed. The second phase test may be conducted using the testing system 400 (or portions thereof) of FIG. 4. In this case, the fluid 437 used in the second phase test includes the same scale inhibitor 447 used in the first phase tests, but the fluid 437 starts with a higher concentration of scale inhibitor 447 compared to the fluid 437 in the first phase test before the second phase test begins. While the concentration of the scale inhibitor 447 in the fluid 437 is higher in the second phase test compared to the concentration of the scale inhibitor 447 in the fluid 437 in the first phase test, the additional fluid components 427 of the fluid 437 are the same in both phase tests. In addition, the contents and amounts of the components of the fluid used in the materials 475 in the second phase test are substantially the same as the contents and amounts of the components of the materials 475 in the first phase test.

Depending on the properties (e.g., porosity, permeability, mineralogy) of the rock used (e.g., the type of rock in the rock matrices 162 and/or the fracture face 102 in the volume 190 of the subterranean formation 110), the rock may adsorb some amount of the scale inhibitor 447 within the fluid 437 during the second phase test. In some cases, the rock used in the second phase test may be taken directly from the wellbore 120. For example, the rock may be one or more core samples extracted from the rock matrices 162 taken along the horizontal section 103 of the wellbore 120. As another example, the rock may be cuttings collected from mud circulation while drilling the wellbore 120. For instance, the rock used in the materials 475 of the second phase test may be a subsample totaling 100 grams made up of fifty 2-gram samples of cuttings collected along the length of the horizontal section 103 of the wellbore 120. In some cases, the rock is ground down to a certain size (e.g., 70 mesh, 100 mesh) or range of sizes to provide a higher effective surface area of the rock. The range of liquid to effective surface area ratio is to be designed to simulate field conditions based on estimated fracture fluid volume, the total fracture surface area generated via the fracture job, and understanding of fracture evolution during the fracturing/shut-in stage and fracture fluid imbibition into the rock matrix.

If a stage (e.g., a hydraulic fracturing stage) of a field operation has multiple parts (e.g., a spearhead followed by fracture fluid), the second phase test may be designed to be representative of (e.g., in terms of time, in terms of pressure, in terms of temperature) these multiple parts. For example, a scale inhibitor 447 may also be added in the spearhead acid if acid is used as the spearhead. In such a case, the scale inhibitor 447 added to the additional fluid components 427 (e.g., fracture fluid containing field additives, chemical additives) to arrive at the fluid 437 may be adjusted based on, for example, the test results of the spearhead part of the second phase test, the concentration of the scale inhibitor 447 in acid, and acid volumes.

In certain example embodiments, the second phase test may include multiple tests that share a common component (e.g., the composition of the fluid 437 and the concentration of the scale inhibitor 447). For instance, with all other aspects (e.g., the composition and amount of each component (including the scale inhibitor 447) of the fluid 437, the pressure of the contents of the testing vessel 472, the temperature of the contents of the testing vessel 472) unchanged, one second phase test may have materials 475 that include rock that is ground down to between 100 mesh and 70 mesh (or a different size range), while another second phase test may have materials 475 that include larger pieces of the rock.

The duration of the second phase test may be the same as, or different than (e.g., shorter), the duration of the first phase test using the fluid 437. In addition to the duration of the second phase test and trying to replicate the changes to the formation water 161 at the subsurface by adjusting the contents of the materials 475 (or portions thereof, such as the formation water 161) at one or more different points along the duration of the second phase test, other aspects of the second phase test may additionally or alternatively be controlled. For example, the reaction module 470 may be controlled in terms of the pressure and/or temperature that is asserted on the contents (in this case, the mixture of the fluid 437 with the materials 475) of the testing vessel 472 during the second phase test. In addition, or in the alternative, the flow rate of the fluid 437 flowing through the materials 475 in the testing vessel 472 may be controlled during the second phase test. In such cases, the values of the temperature, the pressure, and/or the flow rate may differ at different points of the duration of the second phase test, in some cases in an attempt to simulate the hydraulic fracturing stage, the shut-in stage, and/or any other stages of a subterranean field operation.

Control of some or all of the second phase test may be performed by a controller 404 (or a testing component thereof) using one or more protocols 532, one or more algorithms 533 (e.g., models), and one or more sensor devices 460. In some cases, input for one or more aspects (e.g., an actual concentration of the scale inhibitor 447 in the fluid 437) of the second phase test may be provided (e.g., by a user system 455, by a sensor device 460) to the controller 404. In addition, or in the alternative, control of some or all of the second phase test may be performed by a user 451 (which may include an associated user system 455), the network manager 480, and/or some other component of the testing system 400. For example, one or more users 451 may perform the various functions (e.g., measuring, mixing, observing, evaluating) required to conduct one or more second phase tests. The duration of the second phase test (or portions thereof, such as the simulated duration of the hydraulic fracturing stage of a subterranean field operation) may be measured by the timer 535 of the controller 404.

In certain example embodiments, multiple second phase tests are performed simultaneously (in parallel with each other). In such cases, each of the multiple second phase tests may be distinguished from the other simultaneous second phase tests by varying one or more of a number of factors, including but not limited to the duration of the test, the concentration of the scale inhibitor 447, the type of scale inhibitor 447, the content of the additional fluid components 437, and the proportions (amounts or concentrations) of each of the additional fluid components 437.

As a practical example, when the goal of the testing is to formulate a fracture fluid (including a scale inhibitor 447) for using during a fracturing operation so that months later, during production, extraction of the subterranean resource may be optimized, a user 451 may first calculate the final water chemistry of a mixed solution (the combination of materials 475 that are designed to represent water at the subsurface and a fluid 437 that is designed to represent fracture fluid (a form of additional fluid components 427) mixed with a scale inhibitor 447) based on the first phase tests. The user 451 may then prepare cation and anion stock solutions. The scale inhibitor 447 from the first phase tests may be dosed in the anion solution. For example, for testing the mixture of fracture fluid and formation water, a user 451 and/or other component of the testing system 400 may prepare a stock solution for cation and anions brines rather than prepare a stock solution of fracture fluid and formation water.

When the second phase test is complete, the process proceeds to step 776, where the results of the second phase test are evaluated. The results (e.g., the amount of scale deposition 213 on the rock and/or on the testing vessel 472, the amount of scale inhibitor 447 in aqueous phase after a period of time during the second phase test, the amount of scale inhibitor 447 in the post-reaction fluid 457) of the second phase test may be determined by a controller 404 (or an evaluating component thereof) using one or more protocols 532, one or more algorithms 533, information obtained from a user 451 (which may include an associated user system 455), measurements obtained from one or more sensor devices 460, and/or information obtained from any source in the system 400.

For example, during what equates to the shut-in stage of a field operation, at least some of the scale inhibitor 447 may be adsorbed into the rock (e.g., the rock that forms the rock matrix 162, the rock in the fracture face 102) at the subsurface. As a result, there may be less scale inhibitor 447 present in aqueous phase available in the fluid 437 to reduce/prevent/inhibit the formation of scale depositions 213 than the calculated concentration based on the original concentration of the scale inhibitor 447 in the fracture fluid and the commingling scenarios among fracture fluid and other water sources. In other words, the fluid 437 must have a minimum amount of scale inhibitor 447 in liquid or aqueous phase (e.g., not adsorbed on the rock surface or matrices) to be effective at inhibiting scale depositions 213 during a subsequent stage of a field operation. In such cases, a result of the second phase test that may be evaluated is the amount of scale inhibitor 447 in aqueous phase that is in the mixture of the fluid 437 and the materials 475 after some period of time after initiating the second phase test.

Once the results of the second phase test are evaluated, the process may proceed to step 777, where a determination is made as to whether the results from steps 773 and 776 are sufficient to optimize additional fluid components 437 and the type/concentration of scale inhibitor 447. The determination may be made by a controller 404 (or an evaluating component thereof) using one or more protocols 532, one or more algorithms 533 (e.g., a formula), information obtained from a user 451 (which may include an associated user system 455), measurements obtained from one or more sensor devices 460, and/or information obtained from any source in the system 400.

For example, the controller 404 or a user 451 may determine that if the concentration of scale inhibitor 447 that remains in the solution phase in the fluid 437 (or the post-reaction fluid 457) after the second phase test is complete is substantially equal to (or within some range of values or percentage of) the MSICWOR (from step 773), then the concentration of scale inhibitor 447 in the fluid 437 before the second phase test begins may be considered the optimal or target concentration of the scale inhibitor 447. As another example, the controller 404 may determine that if the amount of scale inhibitor 447 in the fluid 437 (or the post-reaction fluid 457) after the second phase test is complete is within a percentage (e.g., plus-or-minus 20%, 0% to plus 15%, minus 5% to 0%) of the MSICWOR (from step 773), then the amount of scale inhibitor 447 in the fluid 437 before the second phase test begins may be considered the optimal or target concentration of the scale inhibitor 447.

When the fluid 437 (e.g., fracturing fluid) is used during a stage (e.g., a hydraulic fracturing stage) of a field operation, the target concentration of the scale inhibitor 447 determined in the second phase tests of the method may also be the target concentration of the scale inhibitor 447 used in the fracturing fluid during the hydraulic fracturing stage (and before the shut-in stage) of the field operation. If the results from steps 773 and 776 are sufficient to optimize additional fluid components 437 and the type/concentration of scale inhibitor 447, the process proceeds to step 779. If the results from steps 773 and 776 are not sufficient (e.g., incompatibility with other components, not cost-effective) to optimize additional fluid components 437 and the type/concentration of scale inhibitor 447, the process proceeds to step 778.

In step 778, the chemistry of the fluid 437 is changed. In other words, at least one aspect (e.g., an amount or concentration of a fluid component 427, the concentration of the scale inhibitor 447, removal of a fluid component 427 and/or the scale inhibitor 447, addition of one or more different fluid components 427 (e.g., a different fracture fluid chemistry) and/or a different type of scale inhibitor 447) of the fluid 437 is changed. The fluid 437 may be adjusted by a controller 404 (or an adjusting component thereof) using one or more protocols 532, one or more algorithms 533 (e.g., a formula), information obtained from a user 451 (which may include an associated user system 455), measurements obtained from one or more sensor devices 460, and/or information obtained from any source in the system 400. The controller 404 may additionally or alternatively determine precisely how the fluid 437 should be adjusted. Alternatively, the fluid 437 may be adjusted by a user 451. In such a case, a controller 404 may provide instructions to the user 451 (or an associated user system 455) as to how the fluid 437 should be adjusted. When step 778 is finished, such as when only the concentration of the scale inhibitor 447 in the fluid 437 is adjusted, the process reverts to step 774 so that another second phase test may be performed. In other cases, as when the scale inhibitor 447 is changed and/or when the additional fluid components 427 of the fluid change, then the process may revert to step 781.

In step 779, the target fluid 437 with the target scale inhibitor 447 and the target chemistry for the additional fluid components 427 are identified and communicated for field use is communicated. The components of the fluid 437 (e.g., water chemistry composition of fracture fluid), including the type and/or concentration of the scale inhibitor 447, are optimized based on integrated results from step 773 and step 776 (as set forth in step 777) and field operation conditions. Such optimized fracture fluid chemistry components and scale inhibitor 447 type/concentrations are communicated as the operational mixture (the target fluid) to be used in one or more stages of a field operation. The communication may be made by a controller 404 (or the communication module 507 thereof) using one or more protocols 532. The communication may be sent to one or more of the components (e.g., a user 451, the network manager 480) of the system 400. The target fluid 437 may be injected into the subsurface during a field operation. When step 779 is complete, the process proceeds to the END step.

Figure 8:
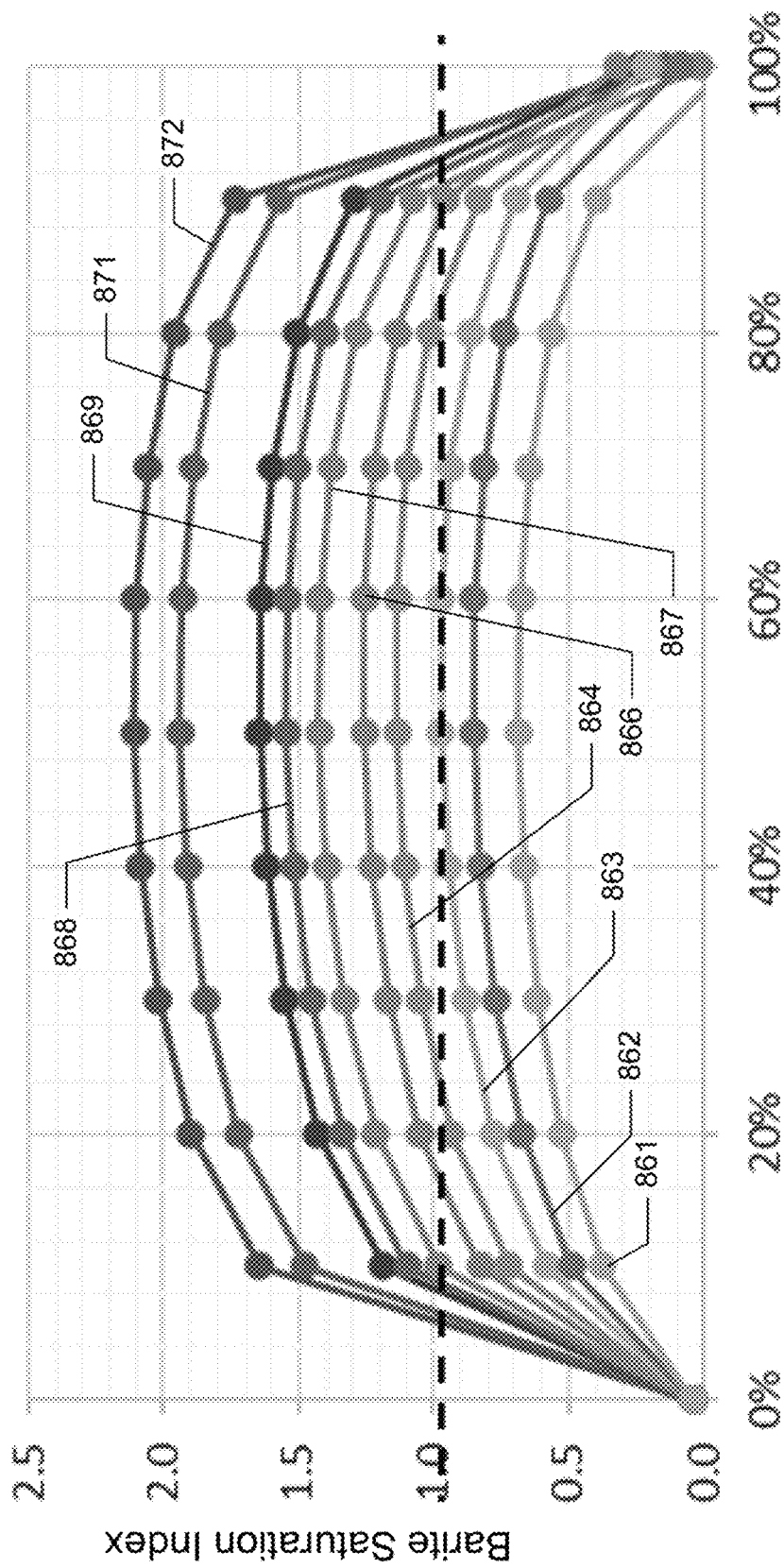
FIG. 8 shows a graph of the impacts of sulfate concentration in fracturing fluid and volume fraction of fracturing fluid on barite scaling potential under fracturing fluid-subsurface water commingling scenarios according to certain example embodiments.

FIG. 8 shows a graph 897 of the impacts of sulfate concentration in fracture fluid and volume percentage of fracture fluid on barite scaling potential under fracture fluid-subsurface water commingling scenarios according to certain example embodiments. Referring to FIGS. 1A through 8, the graph 897 of FIG. 8 has ten plots that are laid out with a calculated Barite saturation index under subsurface conditions along the vertical axis and the percentage of the fracture fluid in mixtures of fracture fluid and a potential water source from the subsurface along the horizontal axis. The saturation index stands for the thermodynamic driving force for scale precipitation in an aqueous solution such as various oilfield waters. The saturation index (SI) is defined as a logarithm of a saturation ratio as shown in the equation below:

$$SI(\text{barite}) \equiv \text{Log}_{10}\left\{\frac{(Ba^{2+})\gamma_{Ba^{2+}}(SO_4^{2-})\gamma_{SO_4^{2-}}}{K_{sp,barite}(T,P)}\right\},$$

where $K_{sp}$ is the solubility product constant of the mineral salt, and $\gamma$ is the activity coefficient.

When the saturation index<0, the solution is under-saturated with respect to mineral salt, and scale depositions 213 will not form. When the saturation index=0, the solution is at equilibrium with respect to mineral salt, and scale depositions 213 will not form. When the saturation index>0, the solution is over-saturated with respect to mineral salt, and there is a thermodynamic driving force for scale depositions 213 to form. The greater (more positive) the value of the saturation index, the stronger the driving force to increase the likelihood and speed at which scale depositions 213 will form.

All ten plots in the graph 897 of FIG. 8 are recorded based on estimated subsurface conditions of 2000 psia and 140° F. The goal of the scale modeling results shown by the plots in the graph 897 is to illustrate the impact of fracture fluid chemistry composition (e.g., $SO_4$ concentration) on barite scaling potential in the mixture of fracture fluid and a potential water source that contains a certain level of Barium at the subsurface (e.g., water from shale matrices, or free water sources at the subsurface). In this specific case, the higher the $SO_4$ concentration in fracture fluid, the higher the Barite saturation index, and also the higher the minimum scale inhibitor concentration required to eliminate/minimize barite scale formation at the subsurface if fracture fluid commingles with such Ba-containing water sources.

Each of the plots show the impact of fraction (percentage) of fracture fluid with different $SO_4$ concentrations on Barite saturation index for the fracture fluid-subsurface water commingling scenario for this specific field case. Plot 861 represents 100 ppm of sulfate. Plot 862 represents 150 ppm of sulfate. Plot 863 represents 200 ppm of sulfate. Plot 864 represents 300 ppm of sulfate. Plot 866 represents 400 ppm of sulfate. Plot 867 represents 600 ppm of sulfate. Plot 868 represents 800 ppm of sulfate. Plot 869 represents 1000 ppm of sulfate. Plot 871 represents 2000 ppm of sulfate. Plot 872 represents 3000 ppm of sulfate. Generally, as the amount of sulfate is increased, more scale inhibitor 447 is required to reduce/prevent/control barite scale depositions 213 during the field stages (e.g., shut in stage).

Figure 9:
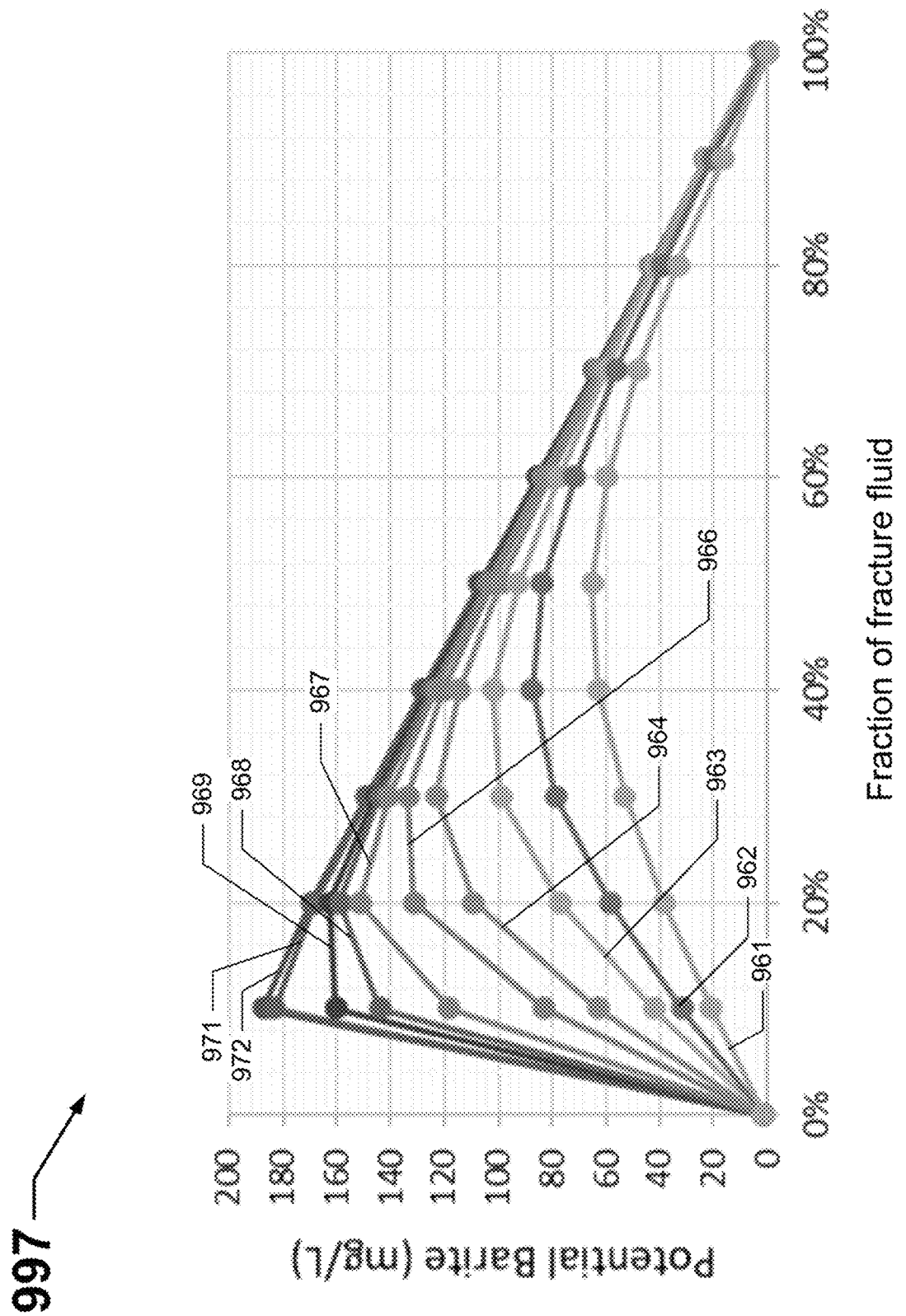
FIG. 9 shows a graph of the impacts of sulfate concentration in fracturing fluid and volume fraction of fracturing fluid on potential barite scale amount under fracturing fluid-subsurface water commingling scenarios according to certain example embodiments.

FIG. 9 shows another graph 997 of the impacts of sulfate concentration in fracture fluid and volume percentage of fracture fluid on potential barite scale amount under fracture fluid-subsurface water commingling scenarios according to certain example embodiments. Referring to FIGS. 1A through 9, the graph 997 of FIG. 9 has ten plots that are laid out with the potential amount of barite scale (in mg/L) along the vertical axis and the percentage of the fracture fluid 437 in a solution that also includes a potential subsurface water (a form of materials 475 or formation water) that contains a certain level of Ba concentration in a specific field case example along the horizontal axis. As in FIG. 8, all ten plots in the graph 997 of FIG. 9 are recorded based on testing conditions of 2000 psia and 140° F. The goal of the scale modeling results shown by the plots in the graph 997 is to illustrate the impact of fracture fluid chemistry composition (e.g., $SO_4$ concentration) on the potential barite scale amount in the mixture of fracture fluid and a potential water source that contains a certain level of Barium at the subsurface (e.g., water from shale matrices, or free water sources at the subsurface). In this specific case, the higher the $SO_4$ concentration in fracture fluid, the higher the potential amount of barite scale (in mg/L), and also the higher is the minimum scale inhibitor concentration required to eliminate/minimize barite scale formation at the subsurface if fracture fluid commingles with such Ba-containing water sources.

Each of the plots show the impact of fraction of fracture fluid with different $SO_4$ concentrations on potential Barite scale amount for the fracture fluid-subsurface water commingling scenario for this specific field case. Plot 961 represents 100 ppm of sulfate. Plot 962 represents 150 ppm of sulfate. Plot 963 represents 200 ppm of sulfate. Plot 964 represents 300 ppm of sulfate. Plot 966 represents 400 ppm of sulfate. Plot 967 represents 600 ppm of sulfate. Plot 968 represents 800 ppm of sulfate. Plot 969 represents 1000 ppm of sulfate. Plot 971 represents 2000 ppm of sulfate. Plot 972 represents 3000 ppm of sulfate. The fraction (percentage) of fracture fluid in the mixture at which the Barite scale amount (in mg/L) is optimized may vary with the $SO_4$ concentration in the fracture fluid.

Figure 10:
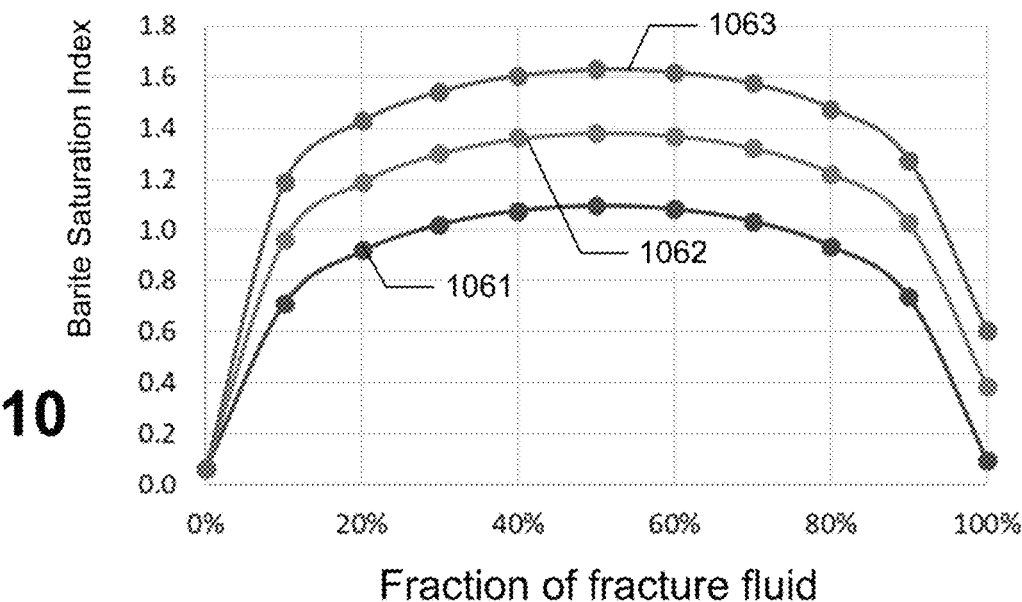
FIG. 10 shows a graph of the impacts of sulfate concentration in fracturing fluid and volume fraction of fracturing fluid on barite scaling potential under fracturing fluid blends according to certain example embodiments.
Figure 11:
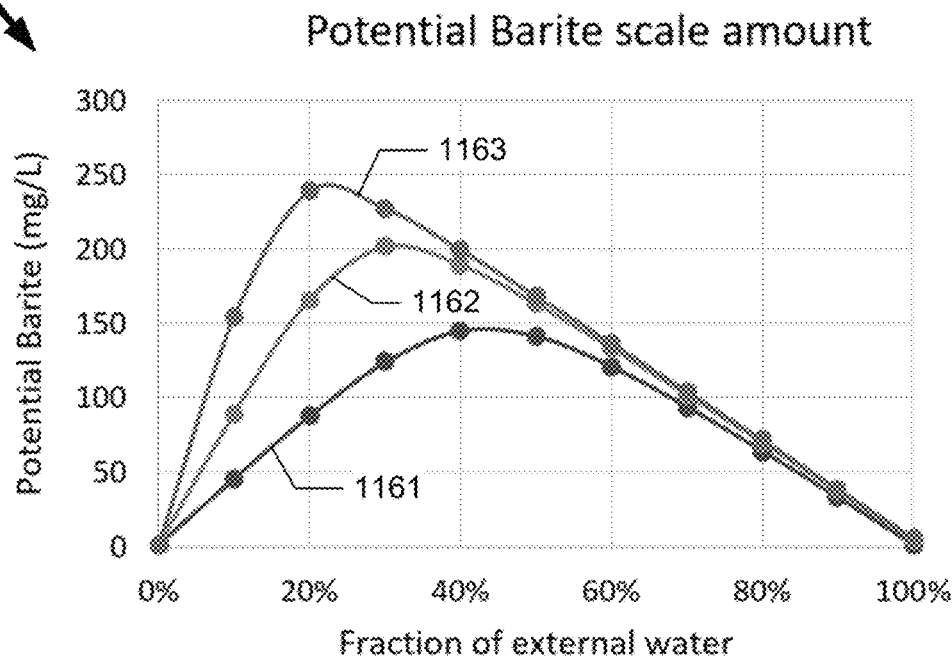
FIG. 11 shows a graph of the impacts of sulfate concentration in fracturing fluid and volume fraction of external water on potential barite scale amount under fracturing fluid blends according to certain example embodiments.

In a field case example to optimize scale deposition in upcoming new wells in shale and tight subterranean formations, different fracture fluid sources and blends thereof may be considered. FIG. 10 shows a graph 1097 of the impacts of sulfate concentration in fracture fluid and volume fraction of fracture fluid on barite scaling potential under fracture fluid blends according to certain example embodiments. FIG. 11 shows a graph 1197 of the impacts of sulfate concentration in fracture fluid and volume fraction of external water on potential barite scale amount under fracture fluid blends according to certain example embodiments.

Referring to FIGS. 1A through 11, the graph 1097 of FIG. 10 has three plots that are laid out with a calculated Barite saturation index under subsurface conditions along the vertical axis and the percentage of the fracture fluid blends in mixtures of fracture fluid blends and a potential water source from the subsurface along the horizontal axis. Each of the three plots of the graph 1097 represents a fracture fluid blend. Specifically, plot 1061 represents fracture fluid blend 1, plot 1062 represents fracture fluid blend 2, and plot 1063 represents fracture fluid blend 3. Similarly, the graph 1197 of FIG. 11 has three plots that are laid out with the potential amount of barite scale (in mg/L) along the vertical axis and the percentage of external water in a solution that also includes a potential subsurface water that contains a certain level of Ba concentration in a specific field case example along the horizontal axis. Each of the three plots of the graph 1197 represents a fracture fluid blend. Specifically, plot 1161 represents fracture fluid blend 1, plot 1162 represents fracture fluid blend 2, and plot 1163 represents fracture fluid blend 3.

Each fracture fluid blend has different levels of dissolved cations and anions (e.g., $SO_4$). During fracturing/shut-in stages, the fracture fluid may potentially commingle with a subsurface water source (e.g., a subsurface water source that originates from the volume 190, a subsurface water source that originates from outside the volume 190, a subsurface water source that originates from adjacent water disposal wells) containing elevated Ba levels (e.g., 200 mg/L). In such cases, there is increased risk of barite scale formation if the fracture fluid mixes with this subsurface water source with elevated Ba concentration.

The modeling plotted in FIGS. 10 and 11 shows Barite scaling potential is lowest when fracture fluid blend 1 is used as the fracture fluid. However, operationally this choice of fracture fluid blend 1 may be more expensive and difficult to use relative to other fracture fluid blends, such as fracture fluid blend 2 and fracture fluid blend 3. While fracture fluid blend 2 and fracture fluid blend 3 may lead to higher barite scaling risk, they may be more easily obtained, easier to use in a field operation, and/or more readily available compared to fracture fluid blend 1. Using example embodiments, all 3 alternatives (plus others) are considered for the fracture fluid to be used in a field operation, taking into account uncertainties in field operations. For example, the experiments may be conducted approximately 8 months before a fracturing stage of a field operation actually takes place and approximately 7 months before fracture fluid sourcing occurs.

A subsequent step is to determine the optimal scale inhibitor treatment, which may vary with the fracture fluid blend selected. For example, the data for fracture fluid blend 2 plotted in FIGS. 10 and 11 is shown in Table 1 below, where the scale inhibitor concentration is assumed to be 100 mg/L.

TABLE 1

| fracture fluid fraction | Modeled Potential Barite scale (mg/L) | Calculated Scale inhibitor concentration in mixture (mg/L) assuming fracture fluid contains 100 mg/L scale inhibitor |
|---|---|---|
| 100% | 5.0 | 100 |
| 90% | 37.5 | 90 |
| 80% | 69.9 | 80 |
| 70% | 101.9 | 70 |
| 60% | 133.2 | 60 |
| 50% | 163.2 | 50 |
| 40% | 189.5 | 40 |
| 30% | 201.7 | 30 |
| 20% | 166.2 | 20 |
| 10% | 89.3 | 10 |
| 0% | 1.6 | 0 |

For scenarios with the fracture fluid fraction of 0% and between (and inclusive of) 40% and 100%, the potential barite scale amount as mg/L is lower than that at fracture fluid fraction of 30%, and the scale inhibitor concentration in the mixture is higher than that at fracture fluid fraction of 30%. The highlighted scenario with 10%/20%/30% fracture fluid in the mixture have a higher risk than other mixing scenarios when fracture fluid blend 2 is used. When designing lab testing, the lower risk scenarios may be skipped, and the testing design may be optimized based on modeling results, as shown in Table 2 below, where MIC represents the minimum concentration of scale inhibitor in first phase tests, FWB2 represents fracture fluid blend 2, and ihn1 represents scale inhibitor 1.

TABLE 2

| Fracture Fluid Fraction | Modeled Potential Barite Scale (mg/L) | MIC | MSICWOR |
|---|---|---|---|
| 100% | 5.0 | No need to test | N/A |
| 90% | 37.5 | No need to test | N/A |
| 80% | 69.9 | No need to test | N/A |
| 70% | 101.9 | No need to test | N/A |
| 60% | 133.2 | No need to test | N/A |
| 50% | 163.2 | No need to test | N/A |
| 40% | 189.5 | No need to test | N/A |
| 30% | 201.7 | MIC_FWB2(30%)_inh1 | (MIC_FWB2(30%)_inh1)/(30%) |
| 20% | 166.2 | MIC_FWB2(20%)_inh1 | (MIC_FWB2(20%)_inh1)/(20%) |
| 10% | 89.3 | MIC_FWB2(10%)_inh1 | (MIC_FWB2(10%)_inh1)/(10%) |
| 0% | 1.6 | No need to test | N/A |

In the first phase tests, the MIC is determined based on the solution mixture. The required scale inhibitor concentration may vary with the fraction of fracture fluid, so the MSICWOR may be different for the different mixing ratios. In some cases, a user 451 and/or an algorithm may make an educated guess to determine which of the MSICWOR values to use. In any case, there may be a need to calculate back to determine the concentration of the scale inhibitor 447 in the fluid 437 to translate to the concentration of scale inhibitor to use in fracture fluid for field operations.

In some cases, a plot may be made of the scale modeling results and scale inhibitor concentration in the mixture versus fraction of fracture fluid, as shown above with respect to FIGS. 10 and 11. This modeling may help to estimate the concentration of scale inhibitor needed for an effective mixture. Economic and other considerations may also be factored into the decision as to the type of scale inhibitor 447, concentration of scale inhibitor 447, and/or chemistry of the additional fluid components 427. Other considerations may include, but are not limited to, the stability and compatibility of the scale inhibitor under field conditions to optimize scale inhibitor selection.

For FWB2 and inh1, the MSICWOR may be the highest among (MIC_FWB2(30%)_inh1)/(30%), (MIC_FWB2(20%)_inh1)/(20%), and (MIC_FWB2(10%)_inh1)/(10%). As an example, at the final stage (into the second phase tests), a testing plan such as shown in Table 3 below may be used to optimize fracture fluid sourcing, scale inhibitor product, and concentration of the scale inhibitor in fracture fluid. In Table 3, FWB1 represents fracture fluid blend 1, FWB3 represents fracture fluid blend 3, inh2 represents scale inhibitor 2, inh3 represents scale inhibitor 3, and MSICWR is the ultimate optimized scale inhibitor concentration with the presence of rock during the second phase tests.

TABLE 3

| | Inh1 | Inh2 | Inh3 |
|---|---|---|---|
| FWB1 | MSICWR1 | MSICWR2 | MSICWR3 |
| FWB2 | MSICWR4 | MSICWR5 | MSICWR6 |
| FWB3 | MSICWR7 | MSICWR8 | MSICWR9 |

Figure 12:
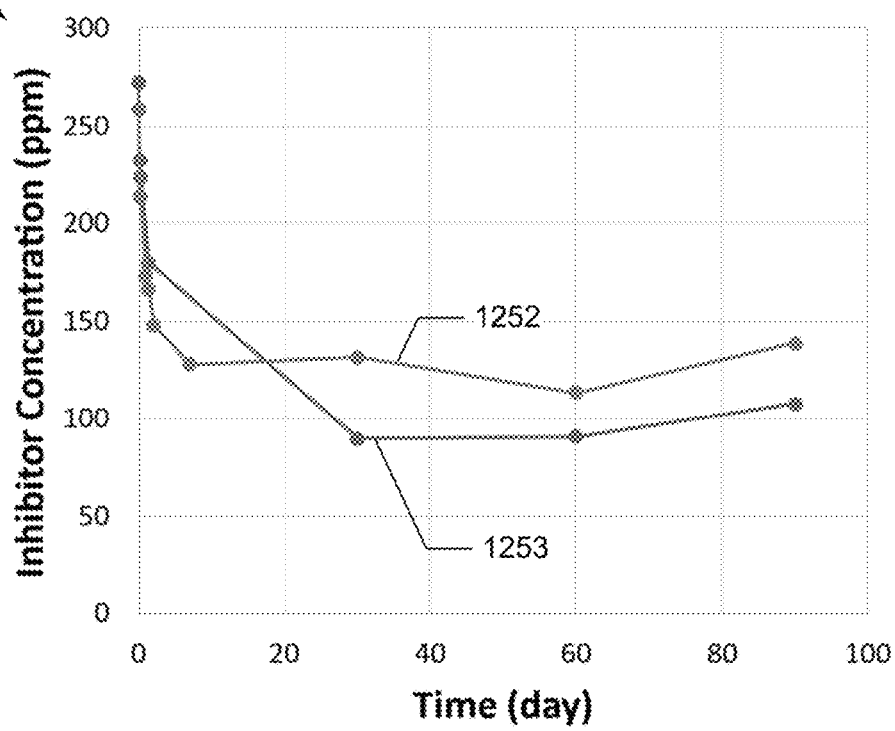
FIG. 12 shows a graph of the impacts of rock adsorption on the concentration of scale inhibitor over time according to certain example embodiments.

FIG. 12 shows a graph 1297 of the impacts of rock adsorption on the concentration of scale inhibitor 447 over time according to certain example embodiments. Referring to FIGS. 1 through 12, the graph 1297 of FIG. 12 has two plots that are laid out with a measured concentration in ppm of a scale inhibitor 447 within a post-reaction fluid 457 along the vertical axis and time in days along the horizontal axis. Specifically, plot 1252 represents one type of scale inhibitor 447, and plot 1253 represents another type of scale inhibitor 447.

In both cases, within the first 5 days, the rock absorbs at least 50% (from approximately 250 ppm to approximately 125 ppm for the scale inhibitor 447 in the post-reaction fluid 457 captured in plot 1252 and from approximately 250 ppm to approximately 96 ppm for the scale inhibitor 447 in the post-reaction fluid 457 captured in plot 1253) of the scale inhibitor 447, and after that time the adsorption rate essentially becomes zero. The additional fluid components 428 of the post-reaction fluid 457 for plot 1252, including concentrations thereof, may be the same as, or different than, the additional fluid components 428 of the post-reaction fluid 457 for plot 1253, including concentrations thereof. The plots 1252 and 1253 show results during second phase tests (as in step 774 in FIG. 7 above).

In some cases, in order to compare the results of the first phase tests with the results of the second phase tests, as in step 777 in the flowchart 758 of FIG. 7 above, which may lead to the identification of a target fluid 437, the concentration of the scale inhibitor 447 used must be sufficiently high so that some amount of scale inhibitor 447 remains in the post-reaction fluid 457 rather than being entirely adsorbed by the rock. In this example, based on the plots 1252 and 1253 of the graph 1297 of FIG. 12, a minimum concentration of a scale inhibitor 447 in the fluid 437 of a second phase test may be 250 ppm based on the adsorption rate of at least 50% of the scale inhibitor 447 by the rock and based on the concentration of scale inhibitor 447 in the post-reaction fluid 457 in first phase tests being approximately 125 ppm.

Figure 13:
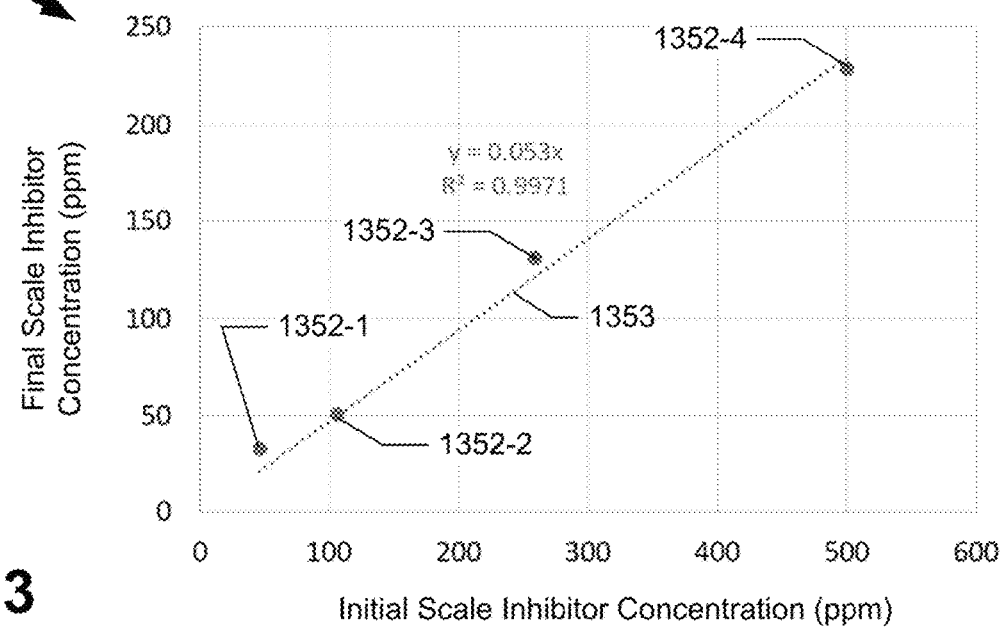
FIG. 13 shows another graph of the impacts of rock adsorption on the concentration of scale inhibitor over time according to certain example embodiments.

FIG. 13 shows another graph 1397 of the impacts of rock adsorption on the concentration of scale inhibitor 447 over time according to certain example embodiments. Referring to FIGS. 1 through 13, the graph 1397 of FIG. 13 has four data points 1352 and one linear plot 1353 that are laid out with a measured final concentration in ppm of a scale inhibitor 447 within a post-reaction fluid 457 along the vertical axis and a measured initial concentration in ppm of the scale inhibitor 447 within a fluid 437 (pre-reaction)

along the horizontal axis. The amount of time between when the initial concentration of the scale inhibitor 447 is measured and the final concentration of the scale inhibitor 447 is measured is 30 days in this example.

Since rock is involved in the experiments plotted in the graph 1397 of FIG. 13, the plots 1352 and 1353 are measurements from second phase tests, as in step 776 of the flowchart 758 of FIG. 7 above. Plot point 1352-1 shows that when the scale inhibitor 447 has an initial concentration of approximately 45 ppm, only about 30% gets adsorbed by the rock. Plot point 1352-2 shows that when the scale inhibitor 447 has an initial concentration of approximately 110 ppm, about 50% gets adsorbed by the rock. Plot point 1352-3 shows that when the scale inhibitor 447 has an initial concentration of approximately 260 ppm, about 50% gets adsorbed by the rock. Plot point 1352-4 shows that when the scale inhibitor 447 has an initial concentration of approximately 500 ppm, about 55% gets adsorbed by the rock. Plot 1353 is a best-fit line of the plot points 1352.

As discussed above, in some cases, in order to compare the results of the first phase tests with the results of the second phase tests, as in step 777 in the flowchart 758 of FIG. 7 above, which may lead to the identification of a target fluid 437, the concentration of the scale inhibitor 447 used must be sufficiently high so that some amount of scale inhibitor 447 remains in the post-reaction fluid 457 rather than being entirely adsorbed by the rock. In this example, based on the plot points 1352 and plot 1353 of the graph 1397 of FIG. 13, for all initial concentrations of the scale inhibitor 447 above approximately 50 ppm, the loss of the scale inhibitor 447 due to rock adsorption is ~50%. Considering this, if the minimum concentration of scale inhibitor 447 in fluid 437 in first phase tests is 100 ppm, then the minimum concentration of scale inhibitor 447 in fluid 437 in second phase tests should be approximately 200 ppm to compensate for adsorption loss.

Figure 14:
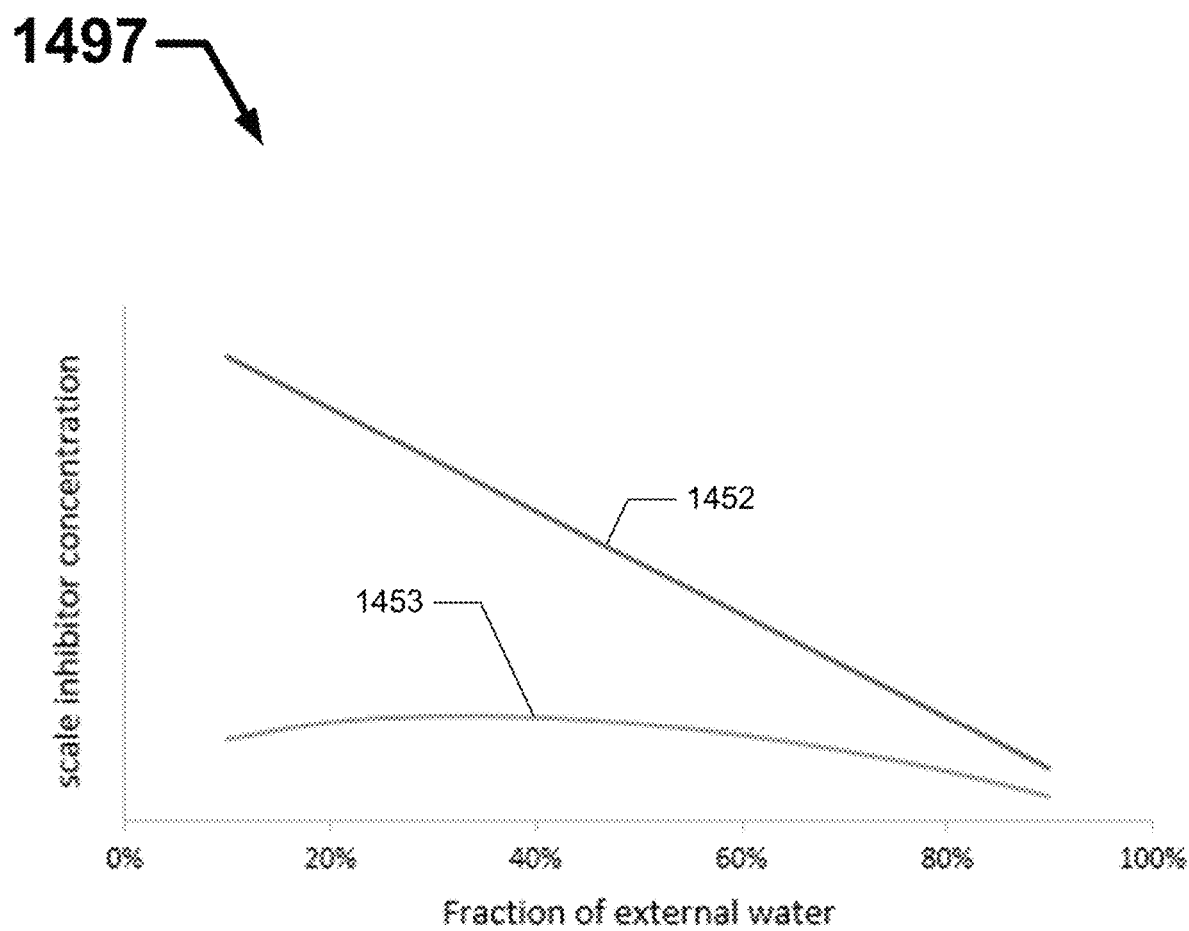
FIG. 14 shows a graph of the results of a scale inhibitor model for various fracture fluid-external water comingling scenarios according to certain example embodiments.

FIG. 14 shows a graph 1497 of the results of a scale inhibitor model for various fracture fluid-external water comingling scenarios according to certain example embodiments. Referring to FIGS. 1 through 14, the graph 1497 of FIG. 14 has two plots (plot 1452 and plot 1453) that are laid out with a concentration in ppm of a scale inhibitor 447 along the vertical axis and a fraction of formation water in a fluid 437 that includes fracturing fluid and the formation water as a percentage along the horizontal axis. Plot 1453 shows the minimum concentration of scale inhibitor 447, and plot 1452 shows the concentration of scale inhibitor 447 in the fluid 437 that includes the fracturing fluid and the formation water.

The graph 1497 shows that, for example, in order to prevent scale formation, the free scale inhibitor concentration in the in-situ water at the subsurface needs to be higher than the required minimum inhibitor concentrations for the shut-in period. The graph 1497 also shows that, for example, the amount of scale inhibitor 447 in the fluid 437 (represented by plot 1452) needs to be greater than the minimum concentration of scale inhibitor 447 (represented by plot 1453), regardless of how little fracturing fluid is in the fluid 437.

Example embodiments may be used to provide systems and methods for evaluating and optimizing a scale inhibitor treatment and fracture fluid sourcing used in a subterranean field operation to improve well performance over multiple stages (e.g., fracking, shut-in, production). Example embodiments include the performance of multiple first phase tests that identify a baseline or minimum amount (concentration) of a scale inhibitor in a fluid (e.g., a fracture fluid) that may eliminate scale depositions when the fluid is mixed with an additional fluid (e.g., formation water). Example embodiments also include performance of one or more second phase tests that mix the two fluids from the first phase test (albeit with higher initial amounts of scale inhibitor in the first fluid) with rock. When the concentration of scale inhibitor in aqueous form at the end of the second phase test is substantially equal to the minimum concentration of scale inhibitor in the first phase test, then the amount of scale inhibitor used to start the second phase test is the target concentration of the scale inhibitor to be used in fracture fluid of a subterranean field operation.

Example embodiments may be used to fully or partially automate the process of evaluating and/or optimizing fracture fluid sourcing and scale inhibitor treatment in fracture fluid used for subsurface field operations. Example embodiments may also communicate the results of an evaluation of a target concentration of a scale inhibitor and optimization regarding scale inhibitor production selection. Using example embodiments, the materials that are tested may be subjected to conditions that mirror those of a fractured subterranean formation. Example embodiments may provide a number of benefits. Such benefits may include, but are not limited to, preventing/reducing scale/solid deposition at the subsurface (e.g., in fractures, on a fracture face, in pore throat), optimizing well performance, ease of use, extending the life of a well (including both producer and injector), reducing damage (e.g., caused by scale/solid deposition) to field equipment, flexibility, configurability, and compliance with applicable industry standards and regulations.

Although embodiments described herein are made with reference to example embodiments, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for evaluating and optimizing scale management at a subsurface for improved well performance, the method comprising:

performing a plurality of first tests, wherein each of the plurality of first tests combines a first fluid with a second fluid, and wherein the first fluid comprises a concentration of a scale inhibitor and a chemistry of additional fluid components;

identifying an optimal mixture of the first fluid among the plurality of first tests, wherein the optimal mixture comprises a minimum concentration of the scale inhibitor that reduces scale deposition;

performing a second test that combines the first fluid with the scale inhibitor, the second fluid, and rock;

evaluating a concentration of the scale inhibitor in aqueous phase after a period of time after initiating the second test; and identifying, based on comparing the minimum concentration from among the plurality of first tests with the concentration of the scale inhibitor after the second test, a target fluid for use in a field operation at the subsurface, wherein the target fluid comprises a target concentration of the scale inhibitor and a target chemistry of additional fluid components.

2. The method of claim 1, wherein the plurality of first tests lacks the rock.

3. The method of claim 1, wherein the plurality of first tests and the second test are performed simulating a condition at the subsurface, and wherein the first fluid and the second fluid used in the plurality of first tests and the second test vary in terms of fluid chemistry and mixing ratios.

4. The method of claim 3, wherein the condition comprises a pressure or a temperature.

5. The method of claim 1, wherein the field operation comprises hydraulic fracturing, and wherein the target fluid is a fracturing fluid.

6. The method of claim 5, wherein the first fluid comprises a chemical additive.

7. The method of claim 5, wherein the first fluid comprises fracture fluid.

8. The method of claim 5, wherein the field operation further comprises a spearhead.

9. The method of claim 1, wherein the second fluid comprises a source of water found at the subsurface.

10. The method of claim 9, wherein the source of water migrates from outside a target volume through fractures, faults, or lineaments.

11. The method of claim 1, wherein the rock is retrieved from the subsurface, and wherein the rock comprises cuttings from the subsurface that are ground down with a range of sizes.

12. The method of claim 1, wherein the rock is retrieved from the subsurface, and wherein the rock comprises a core sample from the subsurface.

13. The method of claim 1, wherein the target concentration occurs when the minimum concentration from among the plurality of first tests is substantially equal to the concentration of the scale inhibitor after the second test.

14. The method of claim 1, wherein the target concentration of the target fluid is based on comparing the concentration of the scale inhibitor after the second test against the minimum concentration from among the plurality of first tests.

15. The method of claim 1, wherein the second test is repeated using a different concentration of the scale inhibitor or a different chemistry of the additional fluid components.

16. The method of claim 1, wherein identifying the target fluid is further based on at least one of a group consisting of field operational conditions, economics in water sourcing, and procurement of the scale inhibitor.

* * * * *